United States Patent
Hoffman

(10) Patent No.: US 11,045,937 B2
(45) Date of Patent: Jun. 29, 2021

(54) COUPLER FOR SPLIT-BOOM POWER TOOL

(71) Applicant: TECHTRONIC CORDLESS GP, Anderson, SC (US)

(72) Inventor: Ronald J. Hoffman, Iva, SC (US)

(73) Assignee: TECHTRONIC CORDLESS GP, Anderson, SC (US)

( * ) Notice: Subject to any disclaimer, the term of this patent is extended or adjusted under 35 U.S.C. 154(b) by 0 days.

(21) Appl. No.: 16/496,681

(22) PCT Filed: Mar. 1, 2019

(86) PCT No.: PCT/US2019/020333
§ 371 (c)(1),
(2) Date: Sep. 23, 2019

(87) PCT Pub. No.: WO2019/169286
PCT Pub. Date: Sep. 6, 2019

(65) Prior Publication Data
US 2020/0406443 A1    Dec. 31, 2020

Related U.S. Application Data

(60) Provisional application No. 62/637,167, filed on Mar. 1, 2018.

(51) Int. Cl.
*B25F 3/00* (2006.01)
*A01D 42/00* (2006.01)
(Continued)

(52) U.S. Cl.
CPC ............... *B25F 3/00* (2013.01); *A01D 42/00* (2013.01); *A01D 75/00* (2013.01); *B25F 5/02* (2013.01);
(Continued)

(58) Field of Classification Search
CPC ...... A01D 42/00; A01D 75/00; A01D 34/416; A01D 34/84; A01D 34/90; A01D 34/866; A01D 34/4165; B25F 3/00; B25F 5/02
See application file for complete search history.

(56) References Cited

U.S. PATENT DOCUMENTS 4,744,690 A * 5/1988 Hsieh .................... F16B 7/1418
248/411
4,991,298 A    2/1991 Matre
(Continued)

FOREIGN PATENT DOCUMENTS

| DE | 202006017820 U1 | 2/2007 |
|---|---|---|
| GB | 2549519 A | 10/2017 |
| WO | 2017129235 A1 | 8/2017 |

OTHER PUBLICATIONS

International Search Report and Written Opinion for related Application No. PCT/US19/20333 dated May 6, 2019 (12 pages).
(Continued)

*Primary Examiner* — Anna K Kinsaul
*Assistant Examiner* — Daniel Jeremy Leeds
(74) *Attorney, Agent, or Firm* — Michael Best & Friedrich LLP

(57) ABSTRACT

A coupler includes a collar defining a member receiving passage. First and second lobes extend outwardly from the collar. The first lobe includes a lobe ramp surface, a cylindrical projection extending from the first lobe and radially surrounding the lobe ramp surface, and a gear extending from the cylindrical portion. A passage is defined in the first and second lobes and has a first axis. A lever arm is rotatable about the first axis. The lever arm includes a lever ramp surface. A pawl arm is movably connected to the lever arm. The pawl arm includes a portion biased into engagement with the gear teeth. A fastener extends through the passage and couples the lever arm to the first lobe so the lever ramp
(Continued)

surface cams with the lobe ramp surface. Rotation of the lever arm in a first direction brings the first and second lobes toward each other.

20 Claims, 18 Drawing Sheets

(51) Int. Cl.
    *A01D 75/00*     (2006.01)
    *B25F 5/02*     (2006.01)
    *A01D 34/416*     (2006.01)
    *A01D 34/84*     (2006.01)
    *A01D 34/90*     (2006.01)

(52) U.S. Cl.
    CPC ............ *A01D 34/416* (2013.01); *A01D 34/84* (2013.01); *A01D 34/90* (2013.01)

(56) References Cited

U.S. PATENT DOCUMENTS

| | | | |
|---|---|---|---|
| 5,802,724 | A | 9/1998 | Rickard et al. |
| 5,809,653 | A | 9/1998 | Everts et al. |
| 6,474,747 | B2 | 11/2002 | Beaulieu et al. |
| 8,060,987 | B1 | 11/2011 | Troudt |
| 8,595,902 | B2 | 12/2013 | Troudt |
| 8,608,118 | B2 * | 12/2013 | Lai ........................ F16B 7/1454 |
| | | | 248/74.3 |
| 2004/0060274 | A1 | 4/2004 | Thomas et al. |
| 2013/0142563 | A1 * | 6/2013 | Sumi ...................... F16B 7/1418 |
| | | | 403/109.1 |

OTHER PUBLICATIONS

European Patent Office Search Report for related Application No. 19160406.5 dated Jul. 26, 2019 (7 pages).
Examination Report issued by the Canadian Intellectual Property Office for Application No. 3,062,484 dated Dec. 30, 2020 (5 pages).

* cited by examiner

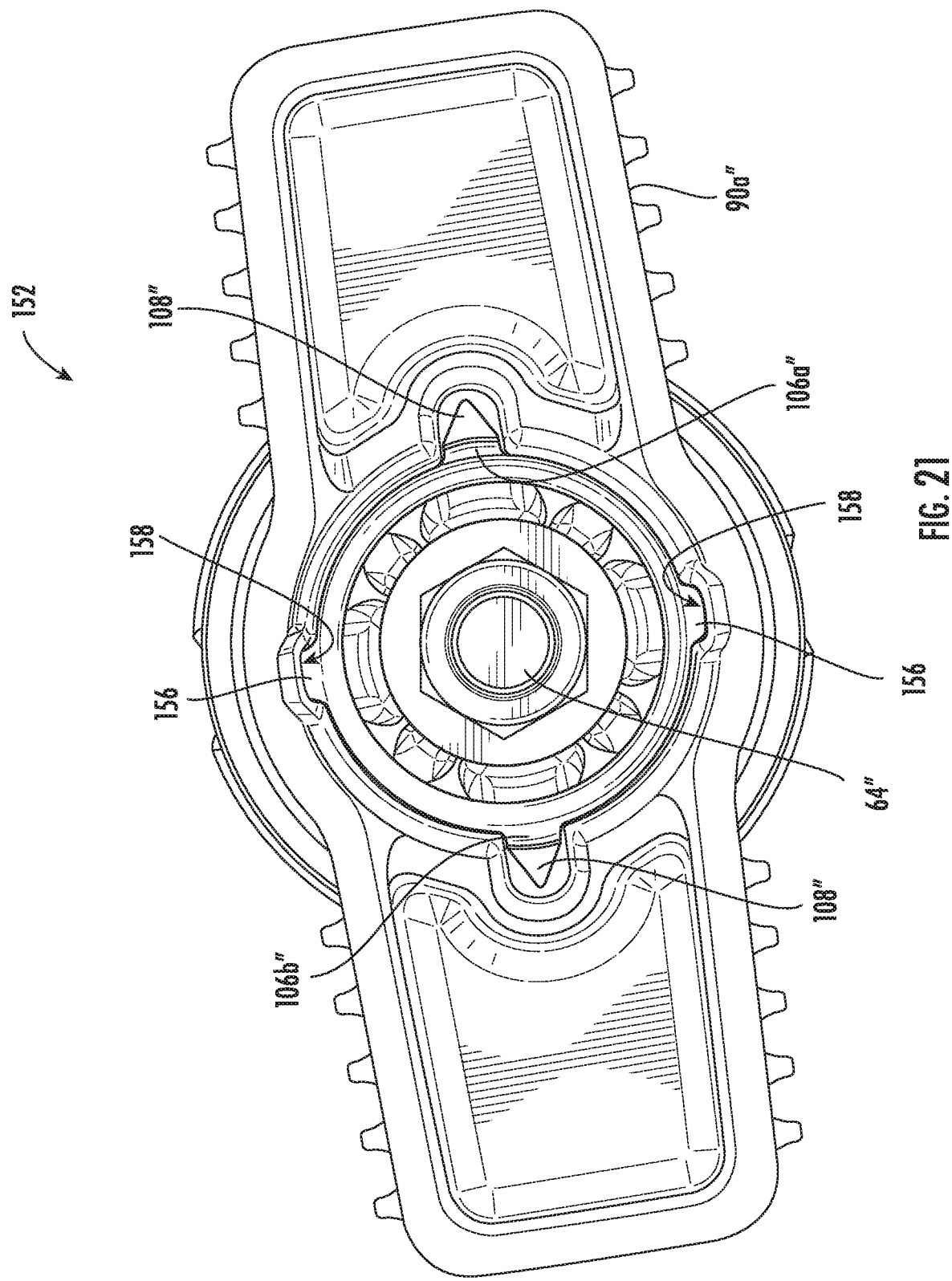

COUPLER FOR SPLIT-BOOM POWER TOOL

CROSS-REFERENCE TO RELATED APPLICATIONS

This application is a national phase filing under 35 U.S.C. 371 of International Application No. PCT/US2019/020333 filed on Mar. 1, 2019, which claims priority to U.S. Provisional Patent Application No. 62/637,167 filed on Mar. 1, 2018, the entire contents of which are incorporated herein by reference.

BACKGROUND

The present invention relates to landscape trimmers, and more particularly, to a coupler for connecting an upper boom and a lower boom of the trimmer.

Generally, landscape trimmers are used to cut grass, weeds, or other vegetation, and are often used to edge around trees, near fences and walls, and along landscape borders. Conventional landscape trimmers include an elongated shaft with a rotating element or gear head near the end of the elongated shaft, and a spool, string head, or blade(s) is attached to the gear head. Typically, the gear head includes a monofilament line (i.e., trimmer line) or blade(s) that is rotated by the gear head for cutting and trimming along landscaped areas, fences, and walls.

SUMMARY

In one embodiment, the disclosure provides a coupler for joining two members of a split-boom power tool. The coupler includes a collar defining a member receiving passage. A first lobe and a second lobe extend outwardly from the collar. The first lobe includes at least one lobe ramp surface, a cylindrical projection extending from the first lobe and radially surrounding the lobe ramp surface, and a gear extending from the cylindrical portion. The gear includes gear teeth. A passage is defined in the first lobe and the second lobe and having a first axis. A lever arm is rotatable about the first axis. The lever arm includes at least one lever ramp surface. A pawl arm is movably connected to the lever arm. The pawl arm includes a portion biased into engagement with the gear teeth. A fastener extends through the passage. The fastener couples the lever arm to the first lobe such that the lever ramp surface is in camming engagement with the lobe ramp surface. Rotation of the lever arm about the first axis in a first direction brings the first lobe and the second lobe toward each other.

In another embodiment, the disclosure provides a coupler for joining two members of a split-boom power tool. The coupler includes a collar defining a member receiving passage. A first lobe and a second lobe extend outwardly from the collar. One of the first lobe and the second lobe includes a plurality of teeth extending radially therefrom. One of the first lobe and the second lobe includes at least one lobe ramp surface. A passage is defined in the first lobe and the second lobe. The passage defines a first axis. A lever arm is rotatable about the first axis. The lever arm includes at least one lever ramp surface. A pawl arm is movably connected to the lever arm. The pawl arm includes a portion that is biased into engagement with the teeth. A fastener extends through the passage. The fastener couples the lever arm to the first lobe and the second lobe. The lever ramp surface is in camming engagement with the lobe ramp surface. Rotation of the lever arm about the first axis in a first direction brings the first lobe and the second lobe toward each other.

In yet another embodiment, the disclosure provides a coupler for joining two members of a split-boom power tool. The coupler includes a collar defining a member receiving passage. A lever arm is rotatable relative to the collar in a first direction to constrict the member receiving passage. The lever arm is also rotatable relative to the collar in a second direction to expand the member receiving passage. A ratcheting assembly engages the collar with the lever arm. The ratcheting assembly allows rotation of the lever arm relative to the collar in the first direction. The ratcheting assembly prevents rotation of the lever arm relative to the collar in the second direction. A biasing member maintains the collar and the lever arm in engagement. Actuation against the biasing member is required to remove the collar and the lever arm from engagement. This removal allows the lever arm to be freely rotated relative to the collar in the second direction.

Other features and aspects of the disclosure will become apparent by consideration of the detailed description and accompanying drawings.

BRIEF DESCRIPTION OF THE DRAWINGS

FIG. 21 is a side elevation view of components of the coupler of FIG. 17.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
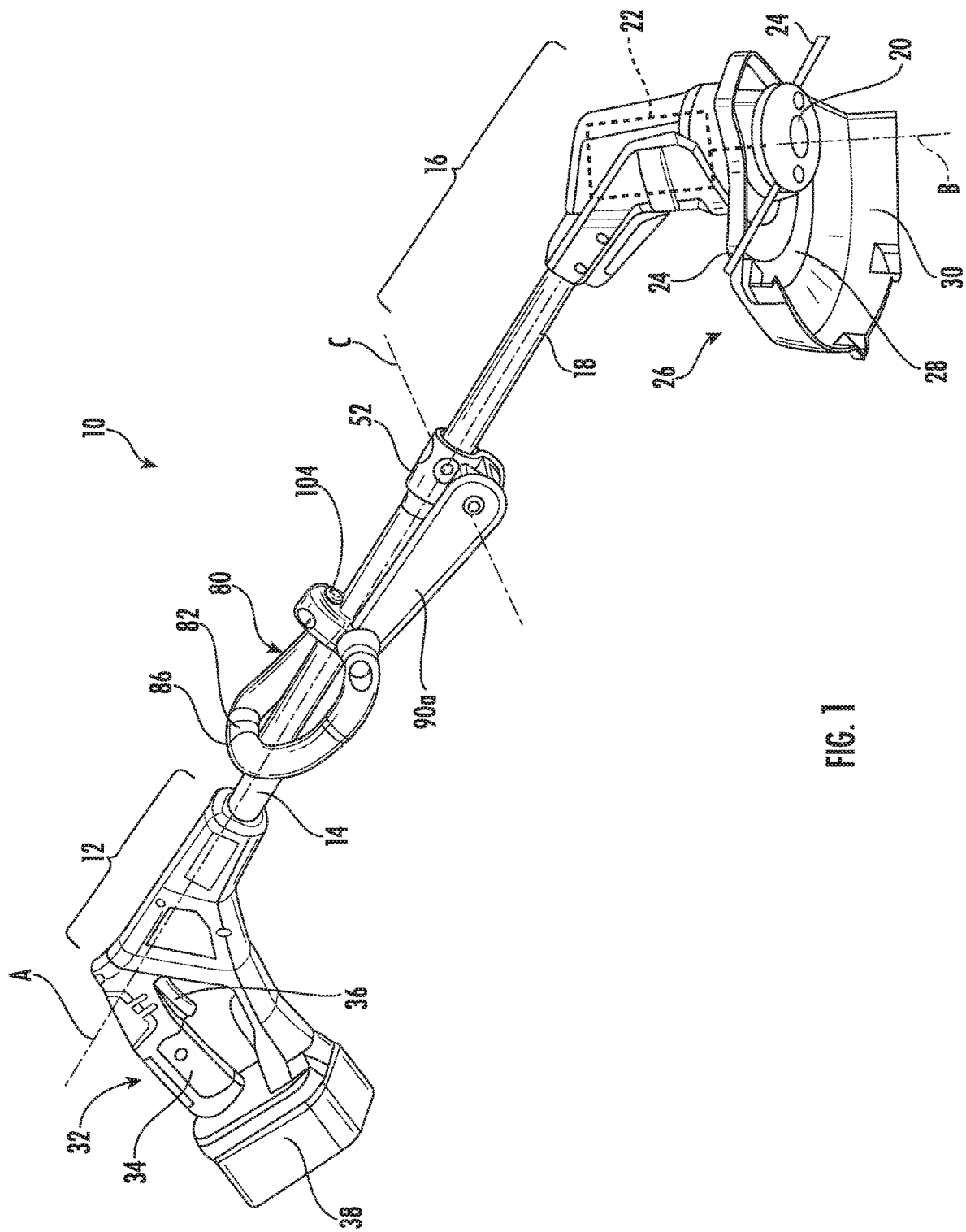
FIG. 1 is a perspective view of a landscape trimmer according to one embodiment.

FIG. 1 illustrates a lawn tool, such as a trimmer 10, having a trigger portion 12 supported on an upper boom (or first boom) 14 and a head portion 16 supported on a lower boom (or second boom) 18. The upper and lower booms 14, 18 are connected coaxially about a central longitudinal axis A, as will be described in greater detail below. In the illustrated embodiment, the trimmer 10 is a hand-held powered trimmer. In other embodiments (not shown), the trimmer 10 may be a different type of powered trimmer and, for example, may include a frame and wheels for movement over the ground.

The head portion 16 includes a cutting head 20 driven to rotate about a cutting head axis B by a motor 22, such as a two-cycle gas engine, an electric motor, etc. The axis B is transverse to the central longitudinal axis A (and therefore also to the lower boom 18). For example, an angle between 0 and 90 degrees is included between the axes A and B, or more specifically the angle is between 30 and 60 degrees. The cutting head 20 includes at least one cutter 24 extending generally radially from the cutting head 20 with respect to the axis B. Two cutters 24 are illustrated in FIG. 1; however, one, three, or more cutters 24 may be employed in other embodiments. In the illustrated embodiment, the cutter 24 includes string or trimmer line. In other embodiments, the cutter 24 may include a blade, a sickle, a wire, or other suitable cutting implement. In yet other embodiments, the cutting head 20 may include a spool (not shown) having a length of cutting line wound thereabout. The cutting head 20 may employ a bump-feed type spool, an auto-feed type spool, a fixed line spool, etc. The head portion 16 also includes a guard 26 disposed generally between the motor 22 and the cutting head 20. The guard 26 includes an arcuate portion 28 having a depending skirt 30 for covering a circumferential periphery of the cutter 24 during rotation thereof.

The trigger portion 12 includes a main handle 32 having a grip portion 34 for controlling the trimmer 10. A trigger 36 is disposed proximate the grip portion 34 for activating the motor 22. In the illustrated embodiment, the trigger 36 and grip portion 34 are configured in a pistol-grip type configuration in which the grip portion 34 is disposed transverse to the axis A of the upper boom 14. However, other configurations may be employed. The trigger 36 is movable by an operator between an ON position in which the motor 22 is activated and an OFF position in which the motor 22 is not activated. The trigger portion 12 also includes a power source 38 operatively coupled to power the motor 22 when the trigger 36 is in the ON position. The power source 38 may include a battery, batteries, or a battery pack as illustrated. However, in other embodiments, the trimmer 10 may be powered by other power sources 38, such as a cord providing AC power (e.g., from a wall outlet), solar cells, a fuel cell, etc.

The trimmer 10 includes an electrical connection 40 (FIG. 2) between the power source 38 and the motor 22. The electrical connection 40 may include wires, such as insulated electrical wires, which pass through the inside of the upper and lower booms 14, 18 from the power source 38 to the motor 22. In other embodiments, the electrical connection 40 may be integrated into the upper and lower booms 14, 18 such that the connection is made both electrically and mechanically when the upper and lower booms 14, 18 are coupled. For example, the electrical connection 40 may include electrical traces of conductive material, or wires, integrated into the upper and lower booms 14, 18 at the interface of the upper and lower booms 14, 18 in which the electrical traces or wires from the upper and lower booms 14, 18 engage, forming an electrical connection between the upper and lower booms 14, 18 when coupled. In yet other embodiments, the battery and motor may both be disposed on the lower boom 18 such that the electrical connection 40 does not pass from the upper boom 14 to the lower boom 18. In further embodiments, the trimmer 10 may include gasoline powered engine driving a flexible shaft, as will be described in greater detail below with respect to FIGS. 12-13.

Figure 2:
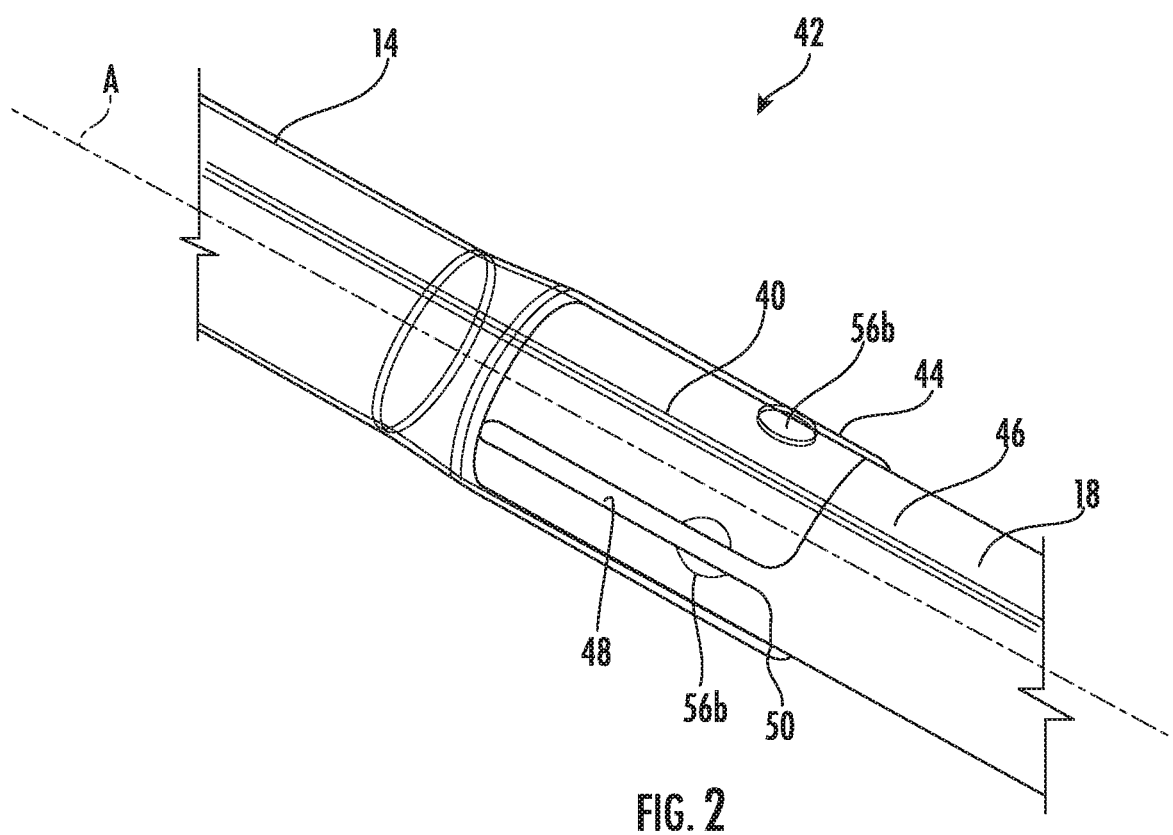
FIG. 2 is a perspective partial view of an interface of upper and lower booms of the landscape trimmer shown in FIG. 1, the upper boom being shown as transparent.

As illustrated in FIG. 2, the upper and lower booms 14, 18 mate at an interface 42 in a coaxial fashion about the axis A. In the illustrated embodiment, the interface 42 includes a receiving portion 44 on the upper boom 14 having a larger diameter than the lower boom 18. The receiving portion 44 receives a distal end portion 46 of the lower boom 18 just radially inwards thereof, fitting together in close contact. In other embodiments, the lower boom 18 may include the larger-diameter receiving portion for receiving the upper boom 14. The receiving portion 44 includes a slot 48 extending from a distal end 50 of the upper boom 14 towards the trigger portion 12 generally axially, parallel to the axis A.

Figure 3:
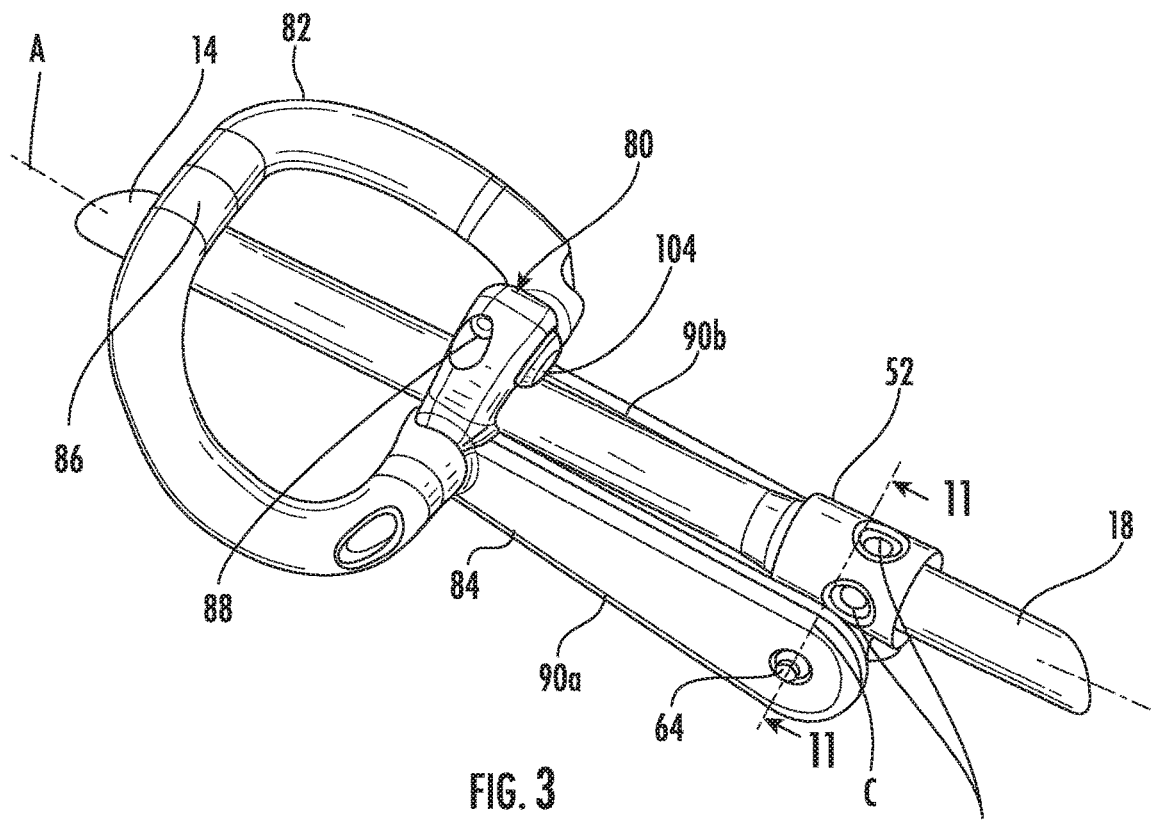
FIG. 3 is a front perspective view of a handle lever with coupler shown in FIG. 1, the handle lever being shown in a non-clamping position.
Figure 4:
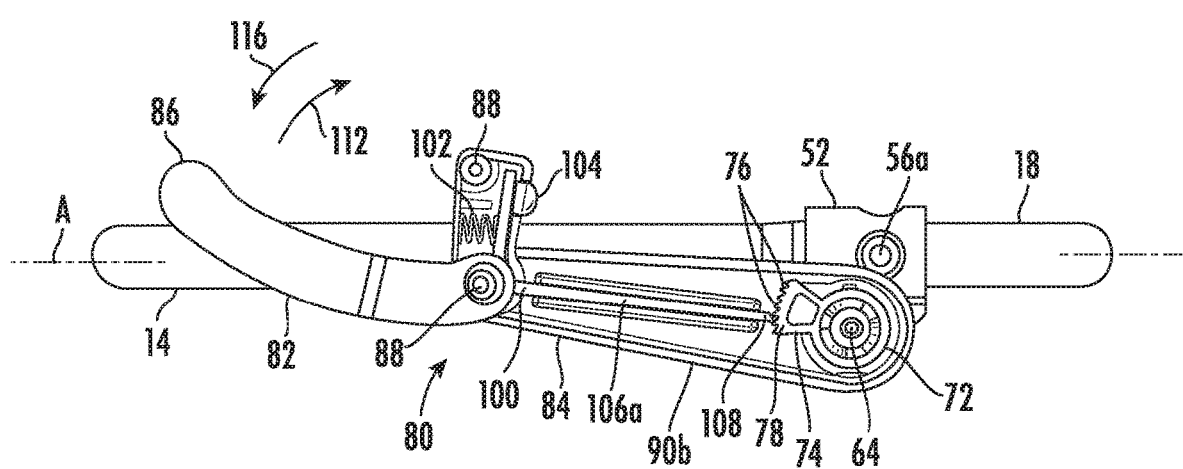
FIG. 4 is a side view of the handle lever with coupler shown in FIG. 3, with a portion of the handle lever shown as transparent.
Figure 5:
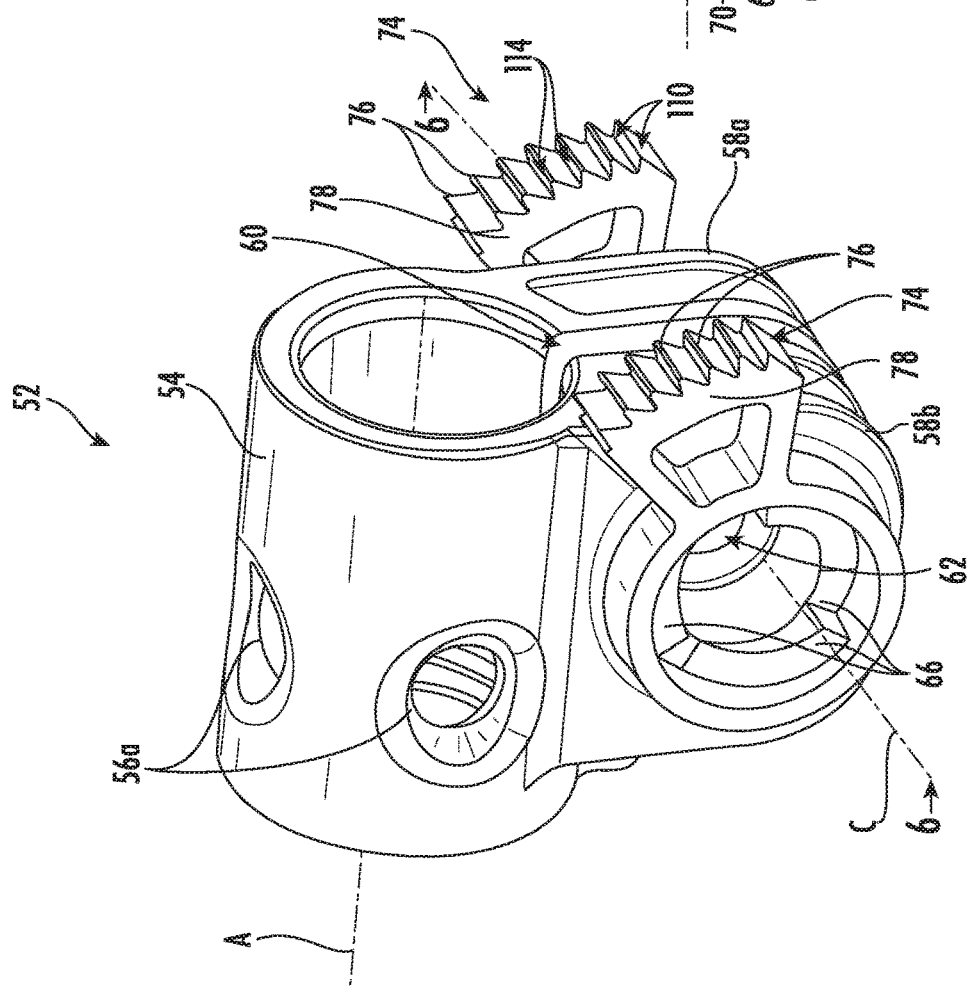
FIG. 5 is a rear perspective view of the coupler shown in FIGS. 1, 3, and 4.

As illustrated in FIGS. 3-5, a coupler 52 is disposed coaxially about the interface 42 of the upper and lower booms 14, 18. Thus, the coupler 52 receives the interface 42 of the upper and lower booms 14, 18. The coupler 52 includes a collar 54 of generally cylindrical body construction disposed circumferentially and coaxially about the interface 42. The collar 54 includes apertures 56a (FIG. 5) passing radially through the generally cylindrical body. In the illustrated embodiment, the collar 54 includes three apertures 56a. However, in other embodiments, the collar 54 may have one, two, four, or more apertures 56a. The receiving portion 44 may have corresponding apertures 56b (FIG. 2). Biased locating pins (not shown) may be disposed in the apertures 56a, 56b. The biased locating pins, which may be spring-loaded radially outward with respect to axis A by a biasing mechanism (not shown), may fasten and/or locate the upper and lower booms 14, 18 with respect to each other and with respect to the coupler 52. In other embodiments, other suitable detent mechanisms may be employed. In yet other embodiments, no locating pins or other detent mechanisms need be employed.

The coupler 52 also includes first and second lobes 58a, 58b extending from the collar 54 in parallel. A gap 60 is defined between the first and second lobes 58a, 58b and extends through the collar 54 such that the collar 54 has a circumferential break and does not form a complete annular ring, thereby providing circumferential flexion of the coupler 52. When assembled, the slot 48 of the receiving portion 46 generally aligns with the gap 60. A passage 62 defining an axis C extends through both lobes 58a, 58b and receives a bolt 64, or other fastener or pin, therethrough. Each of the lobes 58a, 58b is symmetrical about the gap 60. As such, it should be understood that only one lobe need be described herein as each lobe includes the same features facing opposite directions about the gap 60. Thus, like features of each lobe are given the same reference numeral herein.

Figure 6:
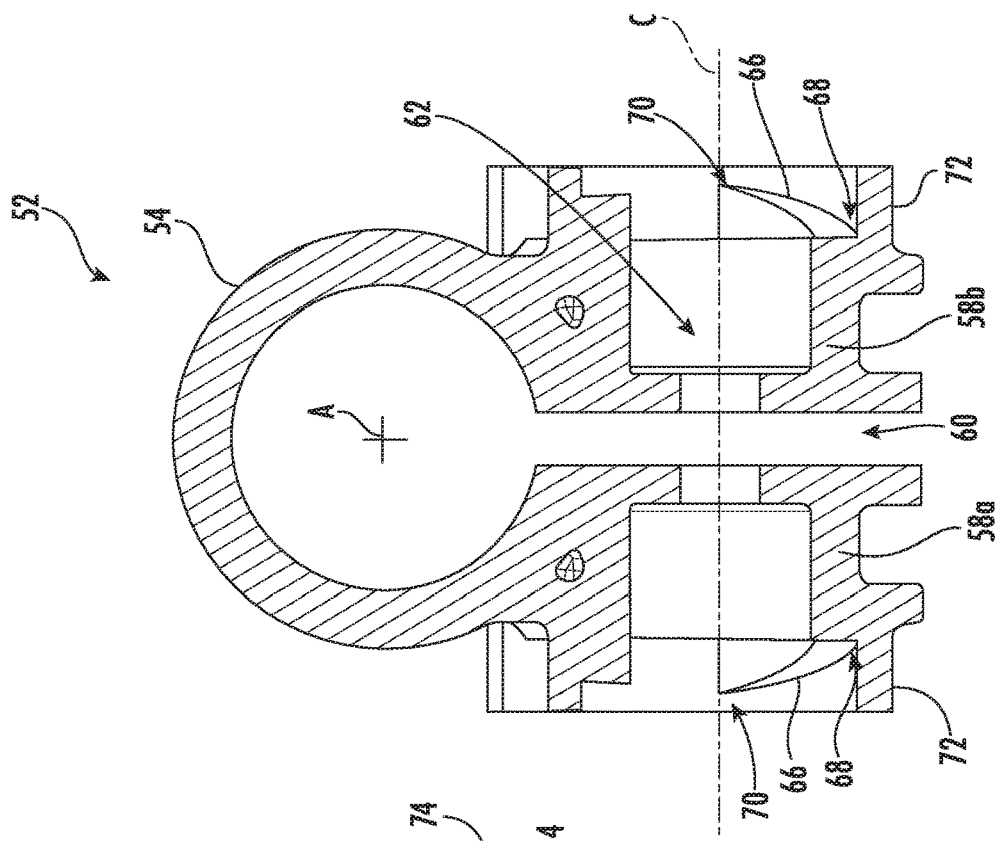
FIG. 6 is a front cross-section view of the coupler taken along line 6-6 in FIG. 5.

The lobes 58a, 58b each include lobe ramp surfaces 66 disposed annularly around the axis C. The lobe ramp surfaces 66 face outwardly away from the gap 60, generally axially with respect to the axis C. In the illustrated embodiment, three lobe ramp surfaces 66 are disposed around the axis C, each lobe ramp surface 66 having a slope extending from a first axial position 68 with respect to the axis C to a second axial position 70 with respect to the axis C (FIG. 6). The second axial position 70 is further away from the gap 60 in the corresponding axial direction than the first axial position 68. In other embodiments, a different number of lobe ramp surfaces 66, such as one, two, four, or more may be employed.

The lobe ramp surfaces 66 are surrounded by a cylindrical projection 72 having a gear 74 extending therefrom. The gear 74 includes asymmetrical teeth 76. In the illustrated embodiment, the gear 74 includes a generally arcuate projection 78 supporting the teeth 76. However, in other embodiments, the gear 74 may be generally circular with the teeth 76 arranged around the gear 74, or have any other suitable arrangement of the asymmetrical teeth 76.

In other embodiments, the coupler 52 may have other configurations. For example, other clamping mechanisms, such as the clamping mechanism shown in FIGS. 17-21 and described with regard to the coupler 52" below, may be employed.

Figure 9:
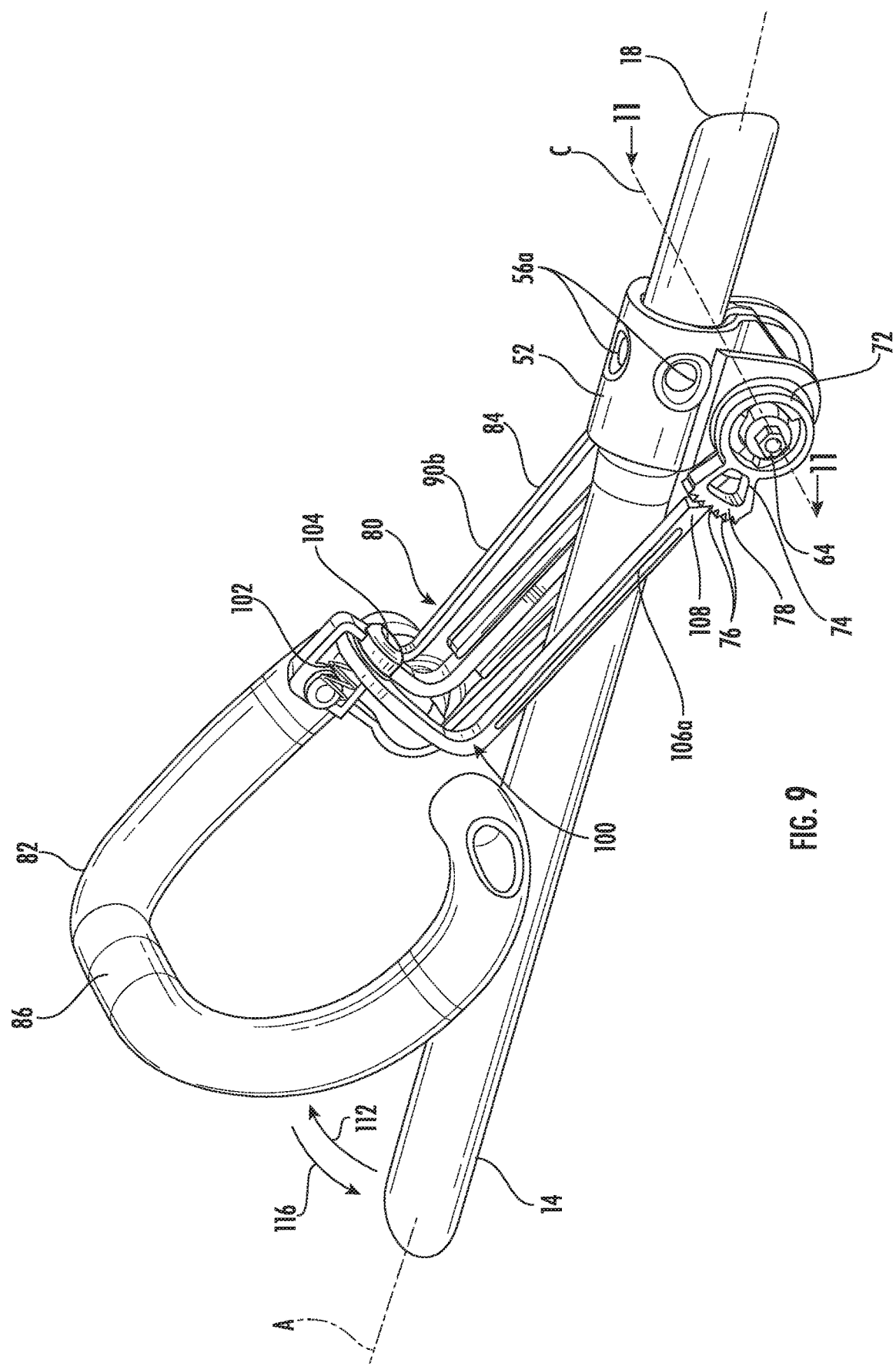
FIG. 9 is a perspective view of the handle lever with coupler shown in FIGS. 1, 3, and 4 having a portion of the handle lever removed, the handle lever being shown in a clamping position.
Figure 10:
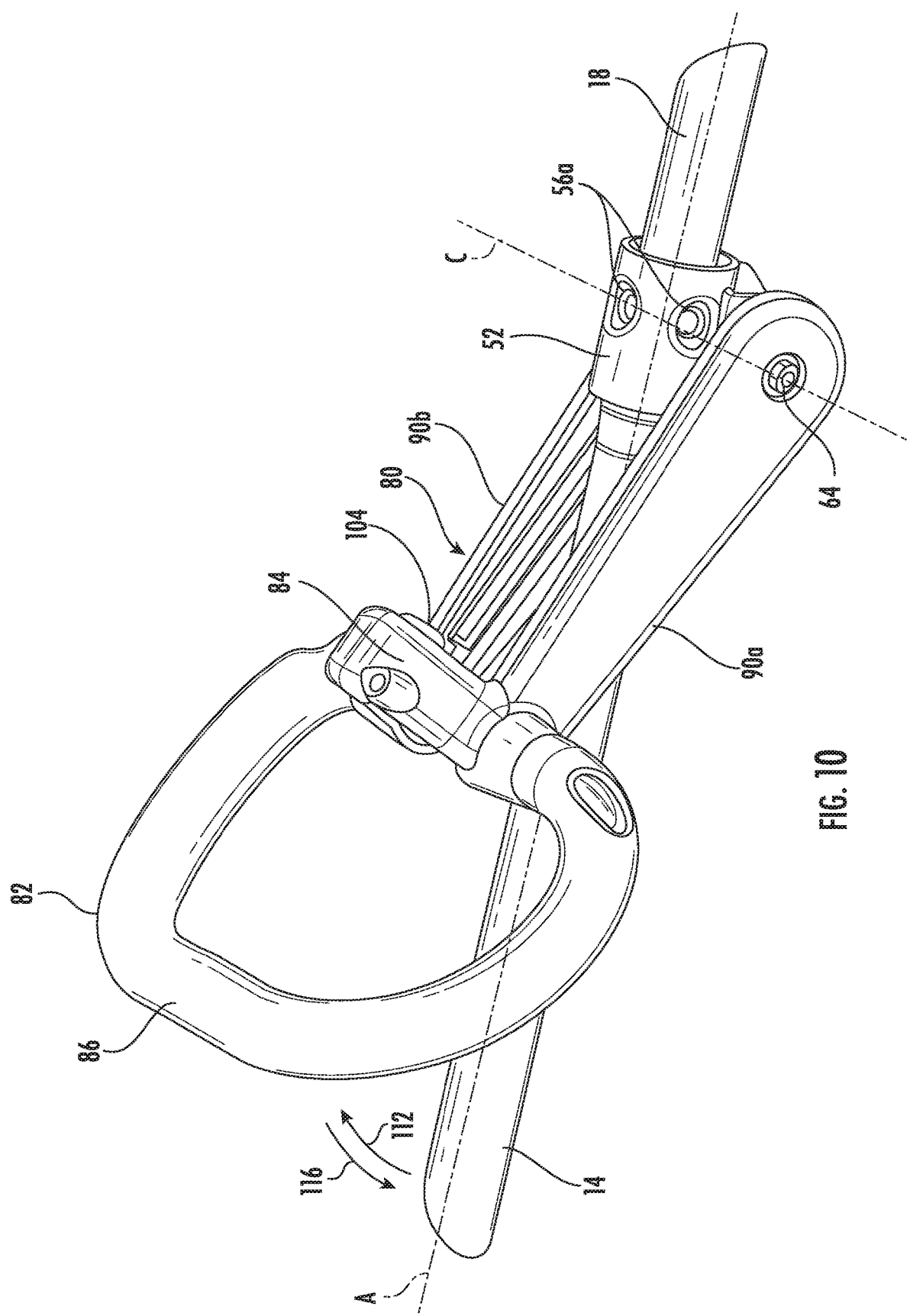
FIG. 10 is a perspective view of the handle lever with coupler shown in FIG. 9 with the whole handle lever.

With reference to FIGS. 1, 3-4 and 9-10, a handle lever 80 is movably coupled to the coupler 52 and is rotatable about the axis C between a non-clamping position (FIGS. 1 and 3-4) and a clamping position (FIGS. 9-10). The handle lever 80 includes a handle portion 82 and a lever portion 84. The handle portion 82 provides a grip surface 86 and in the illustrated embodiment has a generally U-shaped configuration. In other embodiments, the handle portion 82 may have any other suitable shape, such as annular, L-shaped, straight, etc.

The lever portion 84 is fixedly coupled to the handle portion 82, e.g., by way of fasteners 88 such as screws, or any other suitable connector. The lever portion 84 includes first and second lever arms 90a, 90b extending away from the handle portion 82 in parallel. Each lever arm 90a, 90b is movably coupled to one of the lobes 58a, 58b (respectively) of the coupler 52. As described above with respect to the lobes 58a, 58b, the lever arms 90a, 90b are also symmetrical about the gap 60 and corresponding features of each lever arm 90a, 90b will be given the same reference numeral herein. In the illustrated embodiment, the lever arms 90a, 90b are rotatably coupled to the coupler 52 for rotation about the axis C by way of the bolt 64 passing through a boss 92 in each of the lever arms 90a, 90b.

Figure 7:
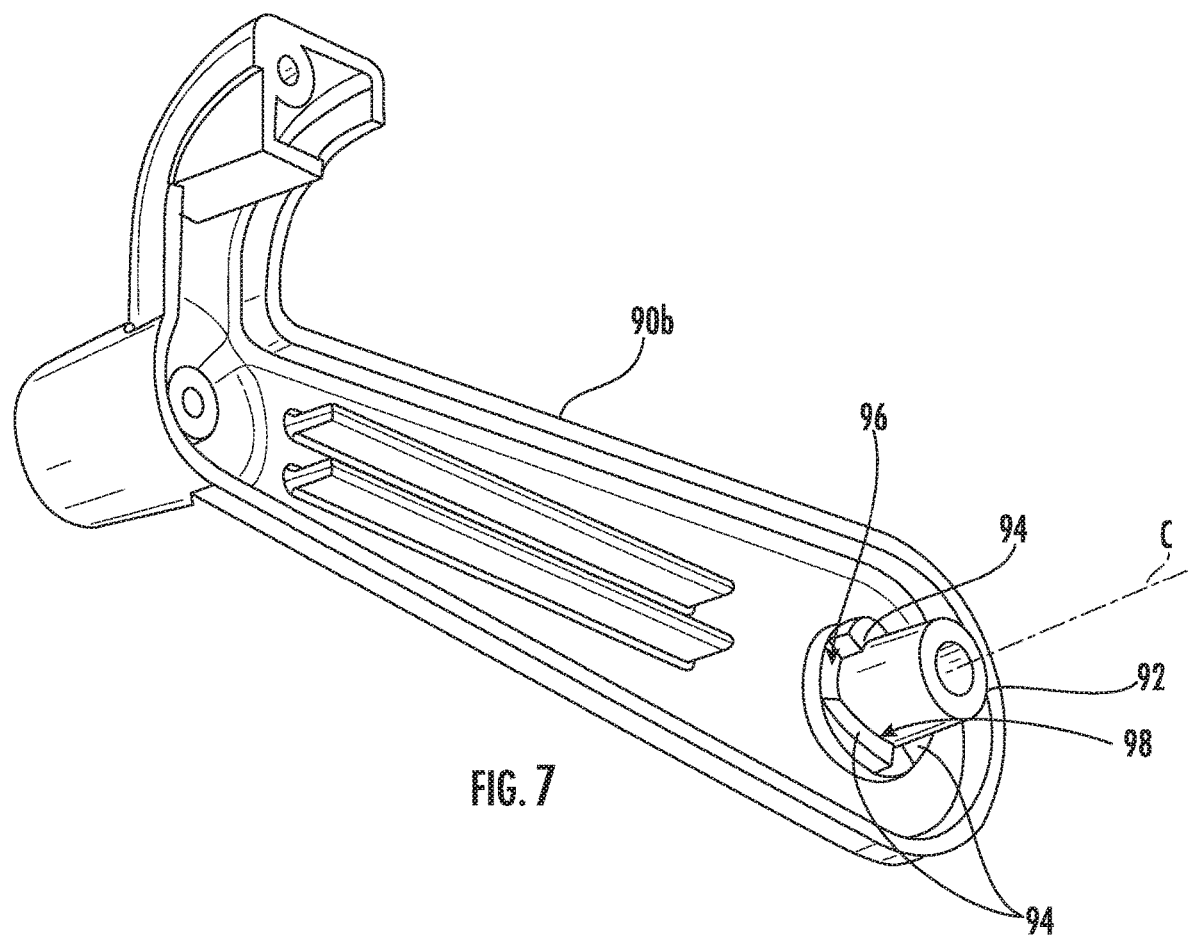
FIG. 7 is a perspective view of a portion of a lever arm shown in FIGS. 1, 3, and 4.
Figure 8:
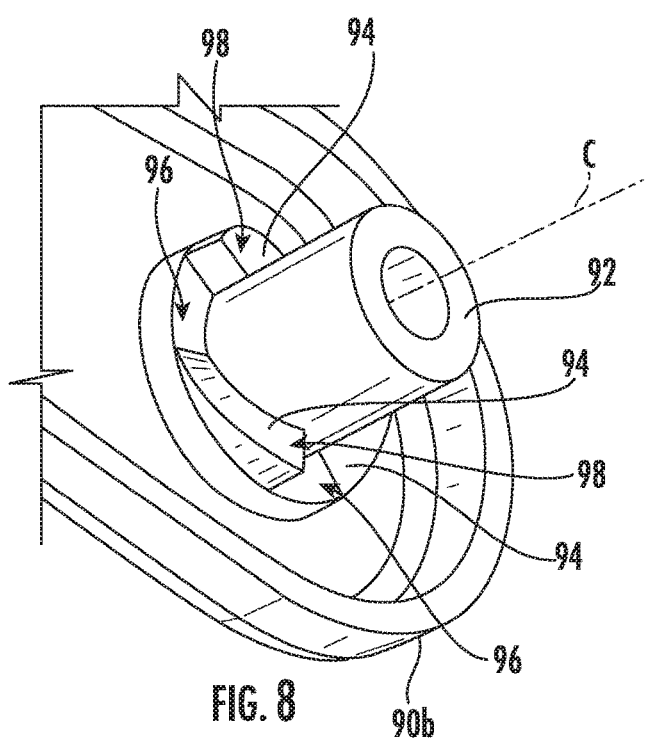
FIG. 8 is an enlarged perspective view of a portion of the lever arm shown in FIG. 7.

As best illustrated in FIGS. 7-8, each lever arm 90a, 90b includes lever ramp surfaces 94 disposed annularly around the axis C and around the boss 92. The lever ramp surfaces 94 face inwards towards the gap 60, generally axially with respect to the axis C. In the illustrated embodiment, three lever ramp surfaces 94 are disposed around the axis C on each lever arm 90a, 90b, each lever ramp surface 94 having a slope extending from a third axial position 96 with respect to the axis C to a fourth axial position 98 with respect to the axis C. The third axial position 96 is further away from the gap 60 in the corresponding axial direction along axis C than the fourth axial position 98. In other embodiments, a different number of lever ramp surfaces 94, such as one, two, four, or more may be employed. When coupled to the coupler 52, the lever ramp surfaces 94 face the lobe ramp surfaces 66 and engage each other in a camming relationship therewith during rotation of the handle lever 80.

The handle lever 80 also includes a slider 100 slidably mounted in the lever portion 84 for linear movement between a ratchet position (shown in FIG. 9) and a release position (not shown). The slider 100 is biased within the lever portion 84 to the ratcheting position by a biasing member 102 (FIG. 4), such as a spring or other suitable member such as elastic material, etc. In the illustrated embodiment, the biasing member 102 is a coil spring, but may be a leaf spring or other type of spring in other embodiments. The slider 100 includes an actuator 104 protruding from the lever portion 84 to an exterior of the trimmer 10 for engagement by an operator's hand or finger to push the slider 100 from the ratchet position to the release position against the bias of the biasing member 102. Without a force applied by the operator against the bias of the biasing member 102, the slider 100 is normally in the ratchet position from a force applied by the biasing member.

The slider 100 includes first and second pawl arms 106a, 106b extending away from the actuator 104 in parallel with each other and in parallel with the lever arms 90a, 90b. The pawl arms 106a, 106b are generally symmetrical about the gap 60, as described above with respect to the lever arms 90a, 90b and the lobes 58a, 58b, and like features of the pawl arms 106a, 106b are given the same reference numerals herein. Each of the pawl arms 106a, 106b includes a beveled tip 108 at a distal end thereof, the beveled tip 108 configured to engage the asymmetrical teeth 76 of the gear 74 in a ratcheting relationship to form a pair of ratcheting assemblies. Specifically, the beveled tip 108 engages and slides against sloped sides 110 (FIG. 5) of the asymmetrical teeth 76 when the handle lever 80 is rotated in a first direction 112 (FIGS. 4 and 9) relative to the coupler 52. The beveled tip 108 is fixed between asymmetrical teeth 76 against a steeply sloped side 114 (FIG. 5) of the adjacent asymmetrical tooth 76 when a force is applied to rotate the handle lever 80 in a second direction 116. Thus, the handle lever 80 is rotatable in the first direction 112 in a ratcheting relationship with the coupler 52 and is not rotatable in the second direction 116 when the slider 100 is in the ratchet position. When the slider 100 is moved to the release position (not shown), the beveled tips 108 are pulled away from the gear 74 and out of engagement with the asymmetrical teeth 76, thus releasing the handle lever 80 such that the handle lever 80 can be rotated in the second direction 116.

FIGS. 12-15 illustrate another embodiment of the lawn tool, such as a trimmer 10', with another embodiment of a handle lever 80' and coupler 52'. Like parts are labeled in FIGS. 12-15 with the same reference numerals used above followed by the prime symbol (') and need not be described again as reference is hereby made to the description above, while different features are described below.

Figure 12:
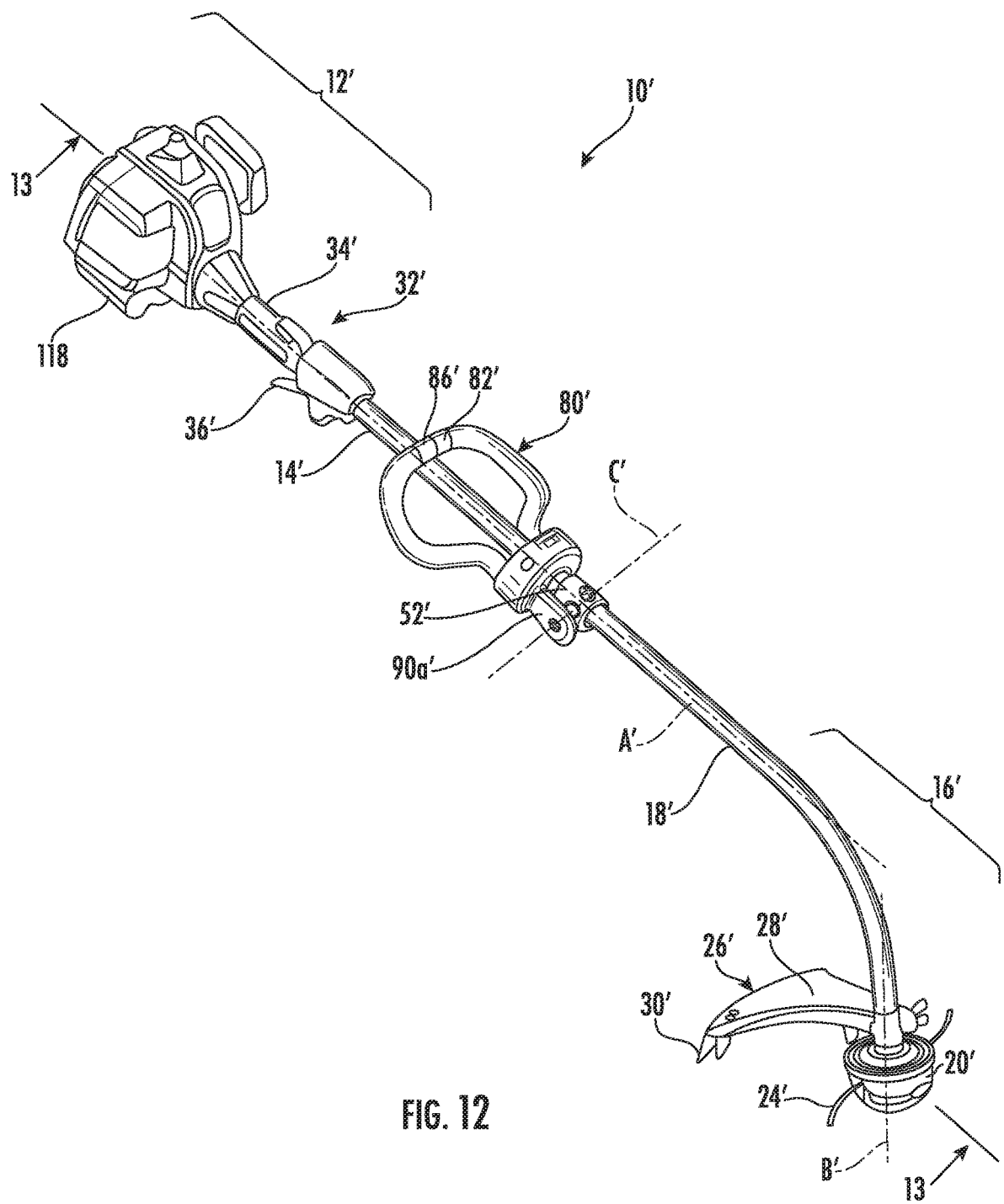
FIG. 12 is a perspective view of another embodiment of a landscape trimmer.
Figure 13:
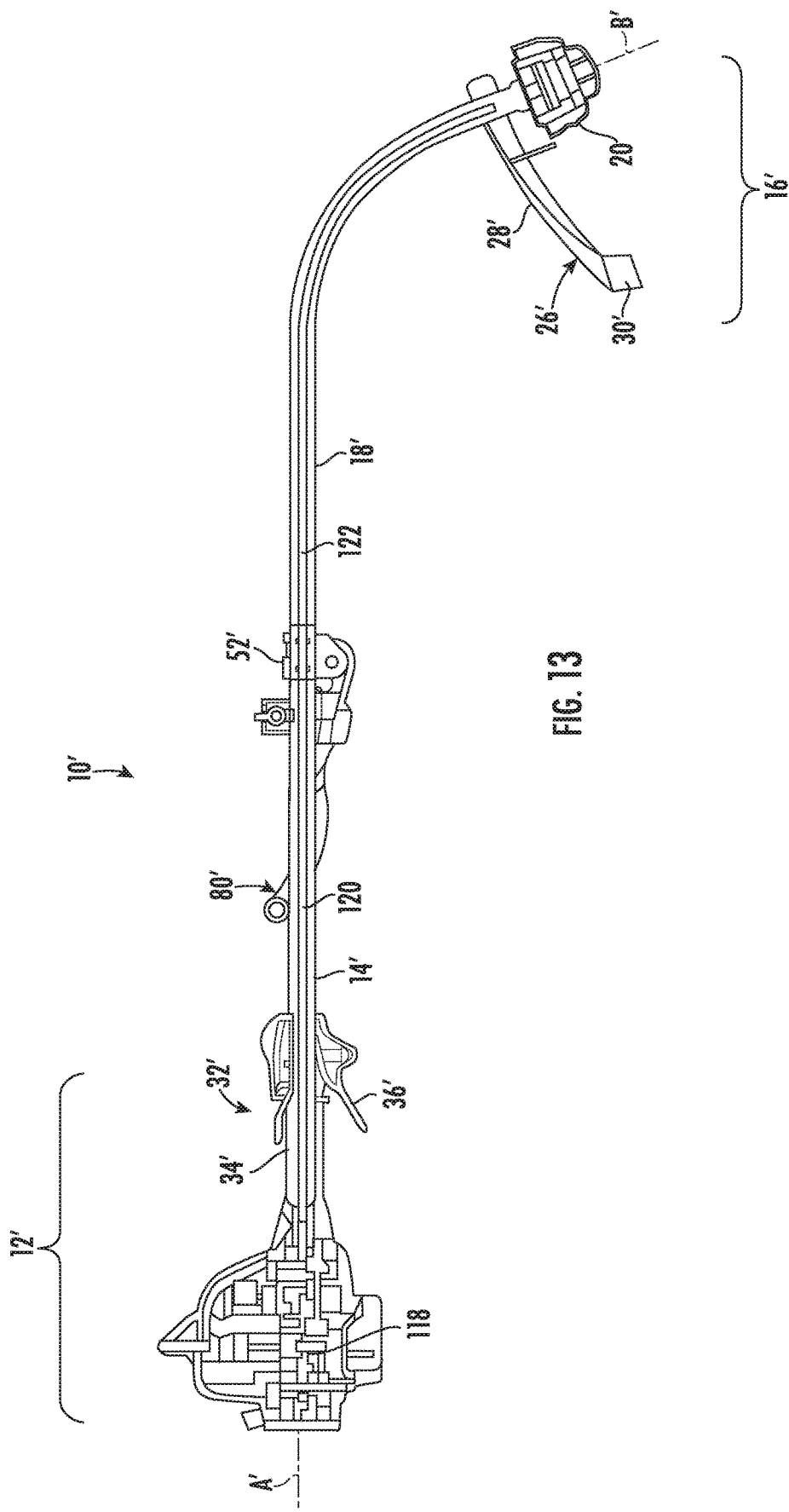
FIG. 13 is a cross-sectional side view of the landscape trimmer taken along line 13-13 in FIG. 12.

With reference to FIGS. 12-13, the trimmer 10' has a trigger portion 12' supporting an engine 118, such as a gasoline-powered engine. For example, the engine 118 may include a 25 cc gasoline-powered internal combustion engine, or other suitable type of engine. The trimmer 10' includes a string trimmer head portion 16', which is similar to the cutting head 16 described above and need not be described again. The trigger portion 12' with engine 118 is operatively coupled to the head portion 16' by upper and lower drive shafts 120, 122 disposed in the upper and lower booms 14', 18', respectively. The upper and lower drive shafts 120, 122 are coupled to each other for common rotation by way of a keyed connection (such as a square shaft for torque transmission) and/or by way of the handle lever 80' and coupler 52'. The upper and lower drive shafts 120, 122 are flexible drive shafts and may be formed from a bundle of entwined wires formed from steel, copper alloys, or other suitable material.

Figure 14:
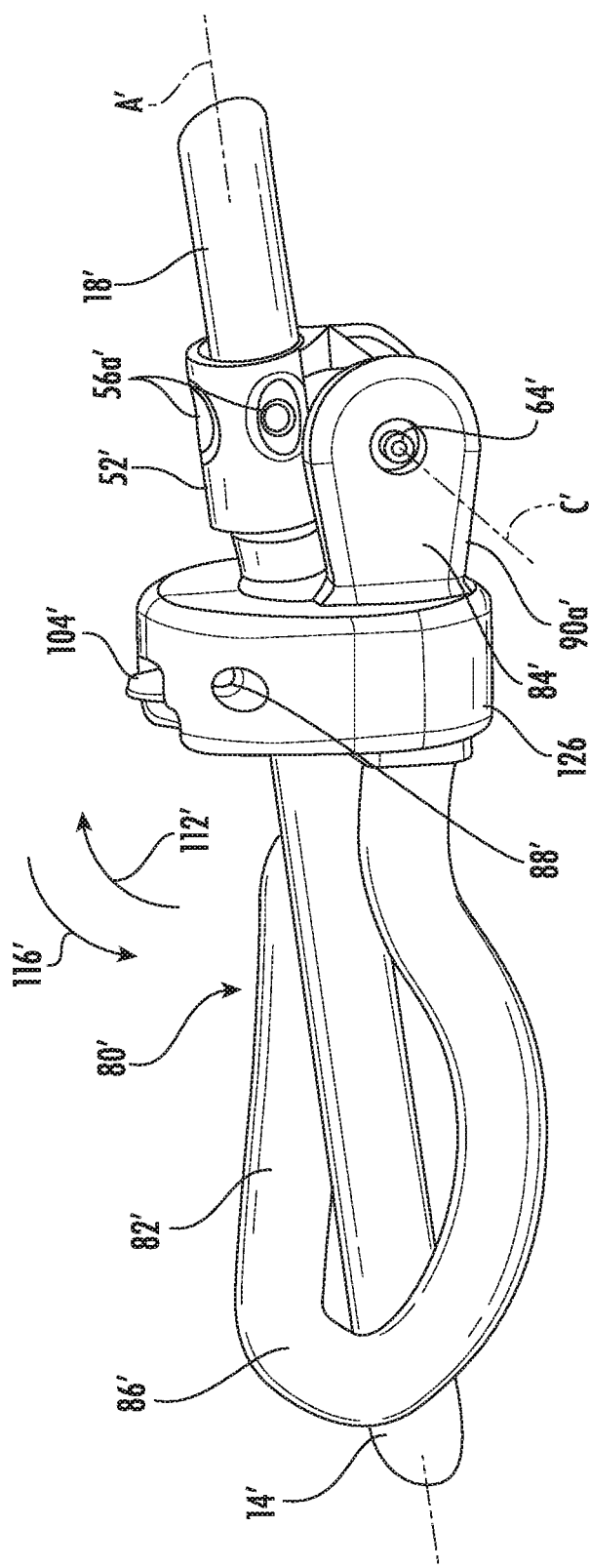
FIG. 14 is a perspective view of a handle lever with coupler of the landscape trimmer shown in FIG. 12, the handle lever being shown in a non-clamping position.
Figure 15:
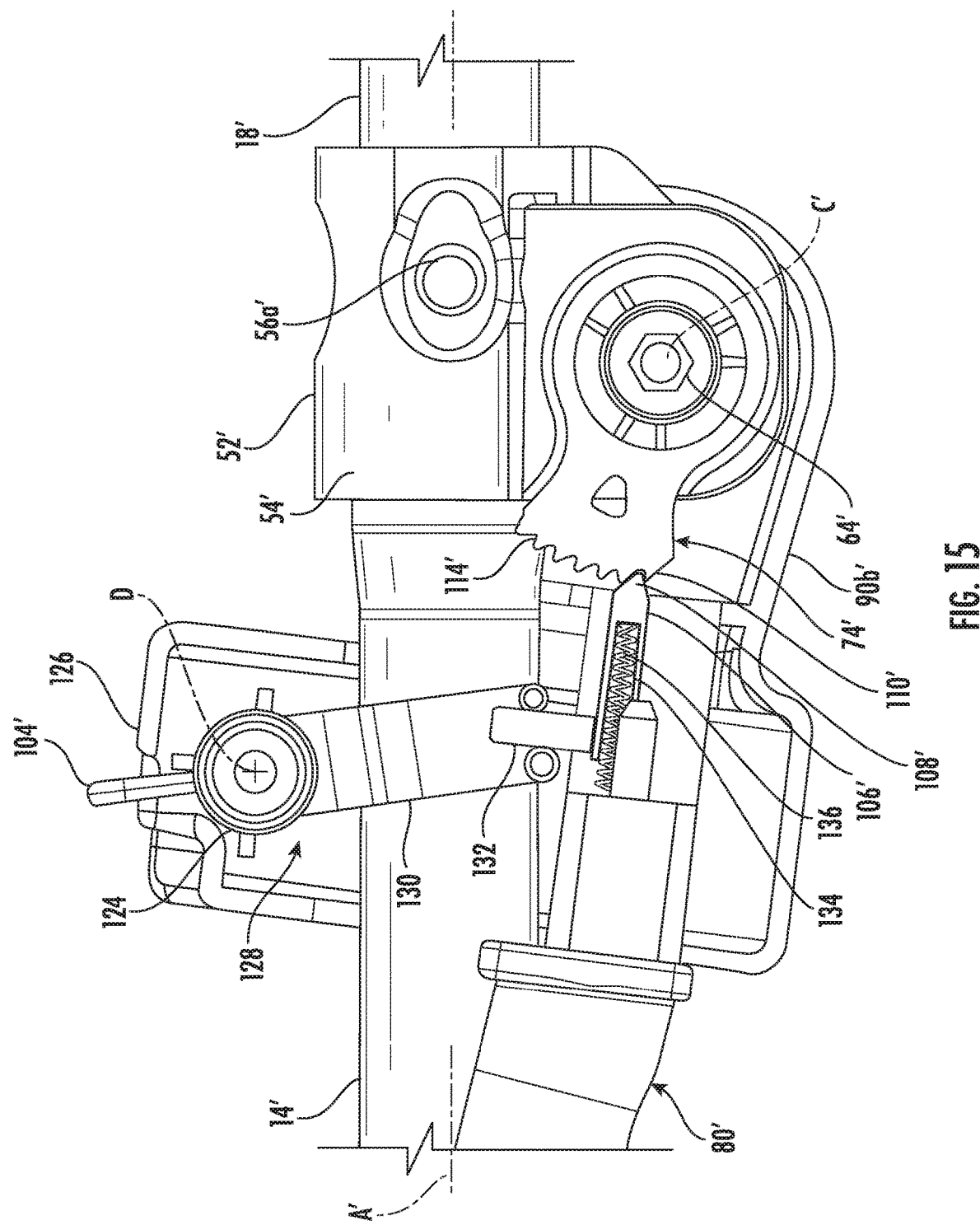
FIG. 15 is a side view of the handle lever with coupler shown in FIG. 14, with a portion of the handle lever housing removed.

With reference to FIGS. 14-15, the coupler 52' is substantially the same as the coupler 52 described above. The handle lever 80' is substantially the same as the handle lever 80 described above except the slider 100 is divided into an actuator portion 124 and first and second pawl arms 106' (the second pawl arm is not shown), each formed as a separate piece. It should be understood that the actuator portion 124, the first pawl arm 106', and the second pawl arm (not shown) have mirror symmetry about the gap (as discussed above) and any description of one side of the actuator portion 124 and the first pawl arm 106' applies to the opposite side of the actuator portion 124 and the second pawl arm in a mirrored relationship.

The actuator portion 124 includes an actuator 104' protruding from a housing 126 of the handle lever 80'. The actuator portion 124 is rotatably mounted about a pivot axis D with the actuator 104' extending radially in one direction and a yoke 128 (with a first yoke arm 130 shown in FIG. 15 and a second yoke arm being a mirror image of the first yoke arm 130 and not shown) extending in another direction. The yoke 128 is operatively coupled to push and pull the first pawl arm 106' into and out of engagement with the gear 74' by way of a post 132 extending from the pawl arm 106'. The yoke 128, by way of the second yoke arm (not shown), is also operatively coupled to simultaneously push and pull the second pawl arm (not shown) into and out of engagement with the gear 74' by way of a post (not shown) in a mirrored fashion with respect to the first yoke arm 130. The first pawl arm 106' and the second pawl arm are each biased towards the gear 74'. For example, the first pawl arm 106' and the second pawl arm each include a spring pocket 134 and a spring 136. However, in other embodiments, other suitable biasing members may be employed. Thus, the first pawl arm 106' and the second pawl arm translate in a linear fashion towards the gear 74' by the biasing force of the spring 136 and away from the gear 74' in response to pivoting motion of the yoke 128. The yoke 128 is also biased by the spring 136 by engagement between the yoke 128 and posts 132. The yoke 128 is pivotable about the axis D by pushing the actuator 104' towards the coupler 52' against the bias of the spring 136.

Figure 11:
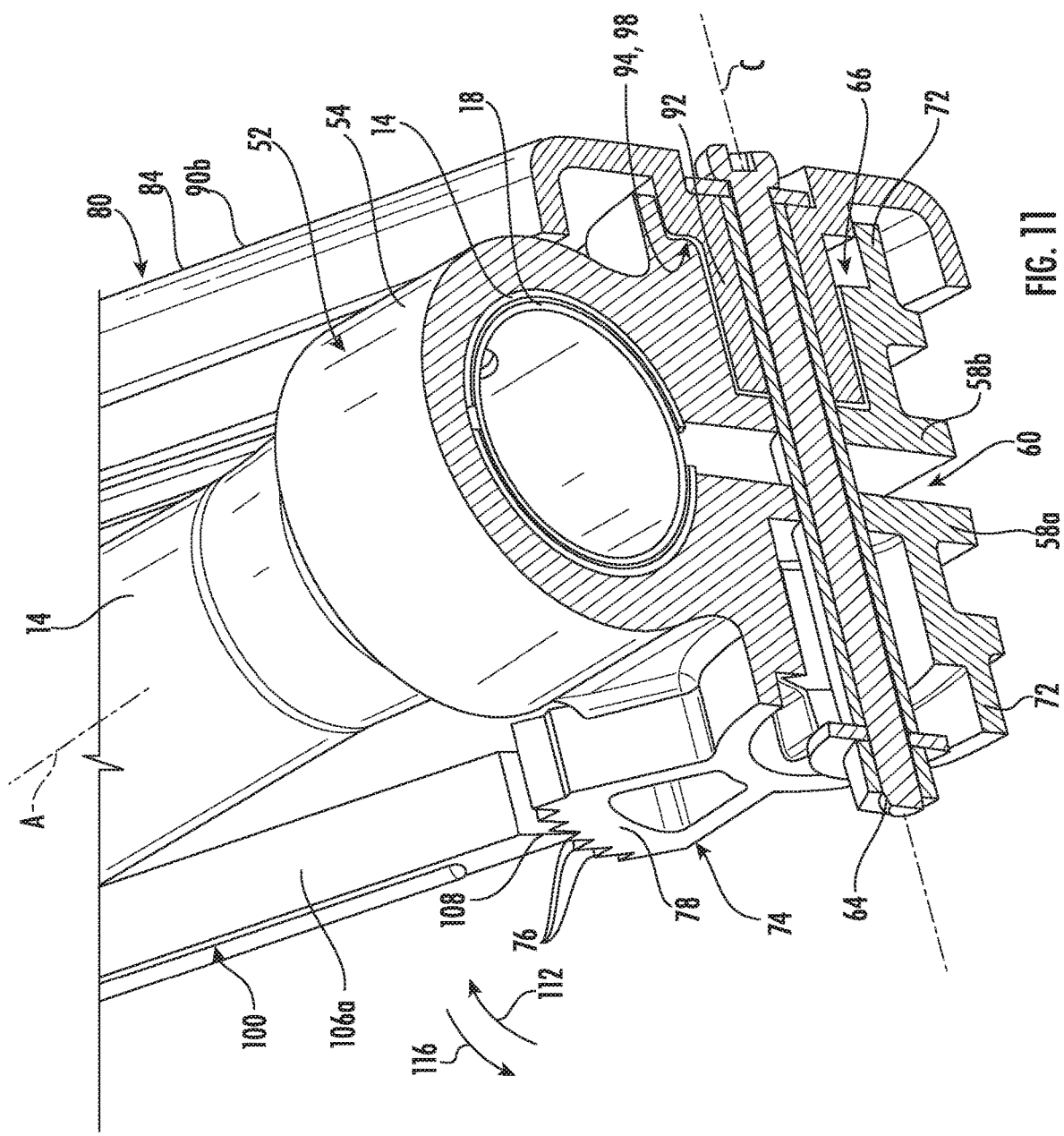
FIG. 11 is a perspective cross-sectional view of the handle lever with coupler taken through line 11-11 in FIG. 9.

In operation, an operator mates the upper and lower booms 14, 18 by inserting the lower boom 14 into the upper boom 18 with the handle lever 80 in the non-clamping position (FIGS. 3-4). The operator grips the handle portion 82 and pulls the handle lever 80 in the first direction 112 towards the clamping position (FIGS. 9-11). During movement towards the clamping position, the handle lever 80 rotates about the axis C in the first direction 112. During movement in the first direction 112, the pawl arms 106a, 106b slide and ratchet against the gear 74, and the lever ramp surfaces 94 engage the lobe ramp surfaces 66 closer to the fourth axial position 98 such that the lever ramp surfaces 94 push inwardly on the coupler 52, as illustrated in FIG. 11.

The bolt 64 holds the lever arms 90a, 90b together and inhibits separation of the handle arms 90a, 90b from each other such that force is directed inwardly by engagement of the ramp surfaces 66, 94. The inward force exerted by the rotation of the lever ramp surfaces 94 in the first direction 112 acts as a clamping force on the coupler 52. The clamping force acts to reduce the size of the gap 60 and shorten the circumference (or cylindrical diameter) of the coupler 52 and of the receiving portion 44 by a small amount. Thus, the coupler 52 and the receiving portion 44 tighten around the distal end portion 46 of the lower boom 18, thereby clamping the upper and lower booms 14, 18 together.

The handle lever 80 stays in the clamping position on its own accord due to the asymmetrical configuration of the teeth 76, which inhibits sliding of the beveled tips 108 of the pawl arms 106a, 106b in the second direction. If a force is exerted on the handle lever 80 in the second direction 116, the beveled tips 108 of the slider 100 engage the steeper sloped side 114 of the adjacent asymmetrical tooth 76 to inhibit movement of the handle lever 80.

While the handle lever 80 is in the clamping position, the upper and lower booms 14, 18 are fixedly coupled and the trimmer motor 22 (or engine 118) may be actuated by the operator gripping the main handle 32 and pulling the trigger 36. Thus, the main handle 32 is used as a primary grip. The operator may use the handle portion 82 of the handle lever 80 as a secondary grip to further balance and manipulate the trimmer 10 during a cutting operation.

To release the handle lever 80 for movement in the second direction 116 back to the non-clamping position, the operator pushes the actuator 104 against the bias of the biasing member 102 to linearly move the slider 100 away from the gear 74, thus pulling the beveled tips 108 out of engagement with the asymmetrical teeth 76.

It should be understood that operation of the other embodiment of the trimmer 10' is the same as described above with respect to the trimmer 10, except that to release the handle lever 80' for movement in the second direction 116' back to the non-clamping position, the operator pushes the actuator 104' towards the coupler 52' against the bias of the spring 136, which pivots the yoke 128, which in turn pulls the first and second pawl arms 106' away from the gear 74', thus pulling the beveled tips 108' out of engagement with the asymmetrical teeth 76'.

FIGS. 17-21 illustrate yet another embodiment of a coupler 52". Like parts are labeled in FIGS. 17-21 with the same reference numerals used above followed by the double prime symbol (") and need not be described again as reference is hereby made to the description above, while different features are described below.

Figure 17:
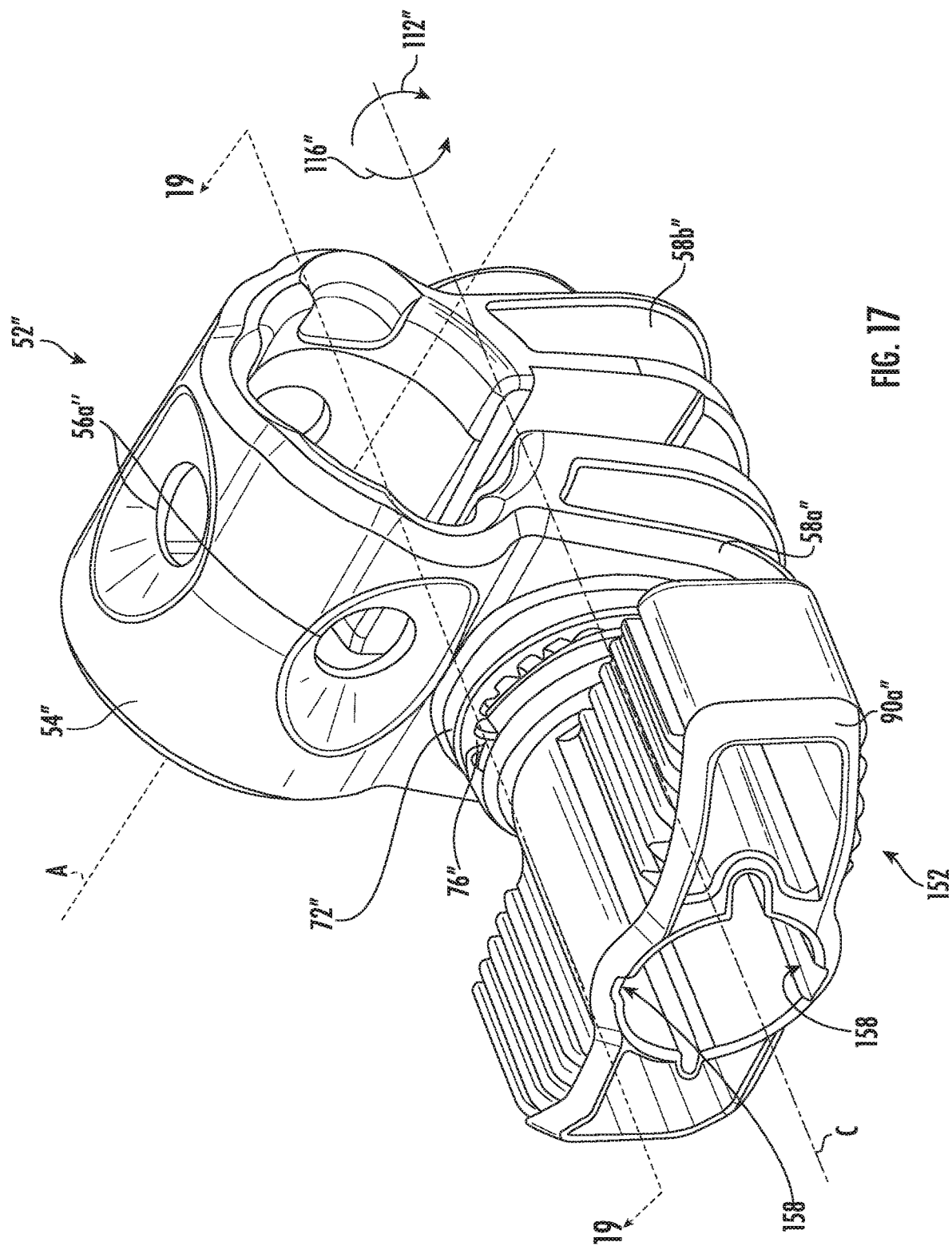
FIG. 17 is a perspective view of another embodiment of a coupler to be positioned between a first boom and a second boom.
Figure 18:
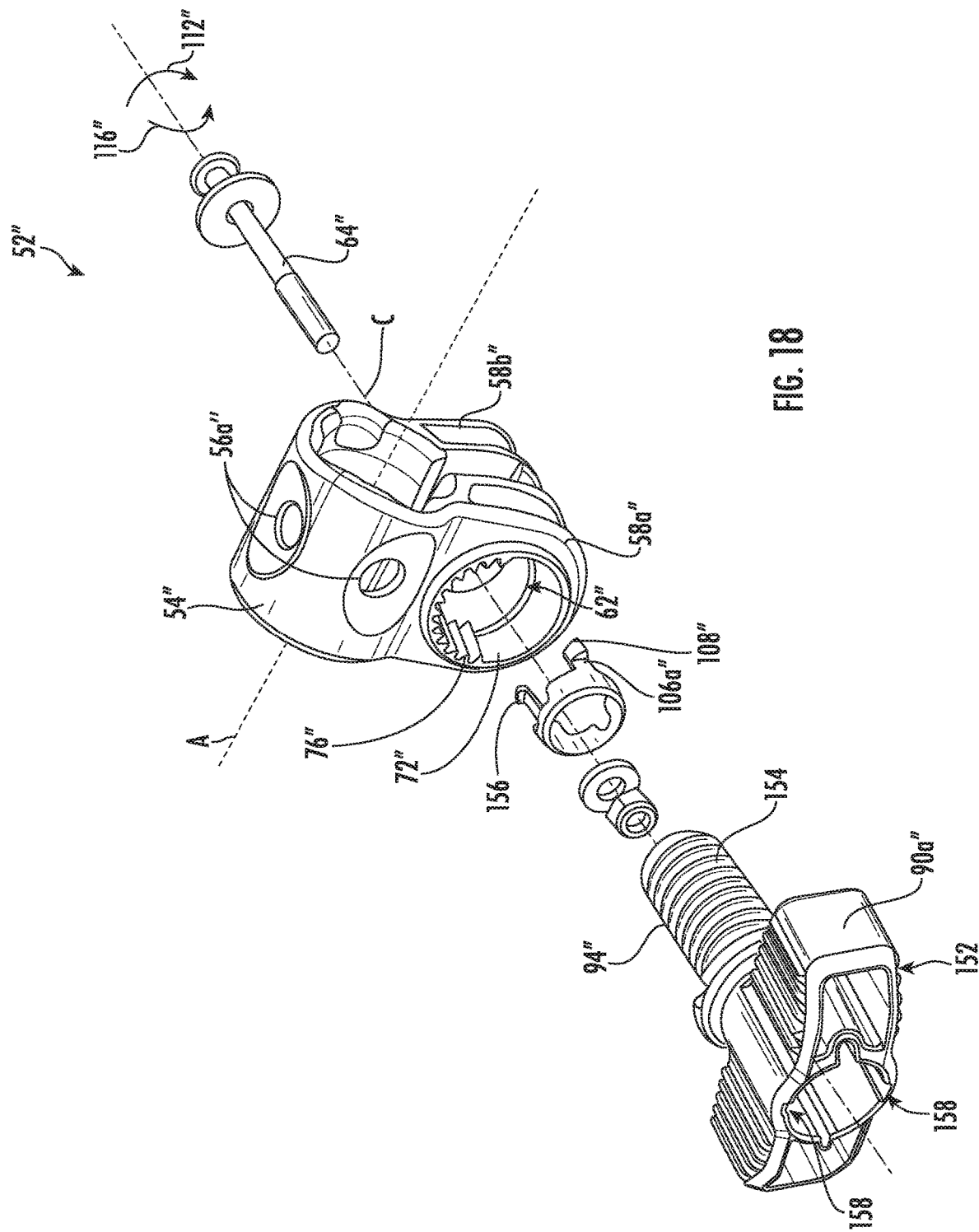
FIG. 18 is an exploded perspective view of the coupler of FIG. 17.
Figure 19:
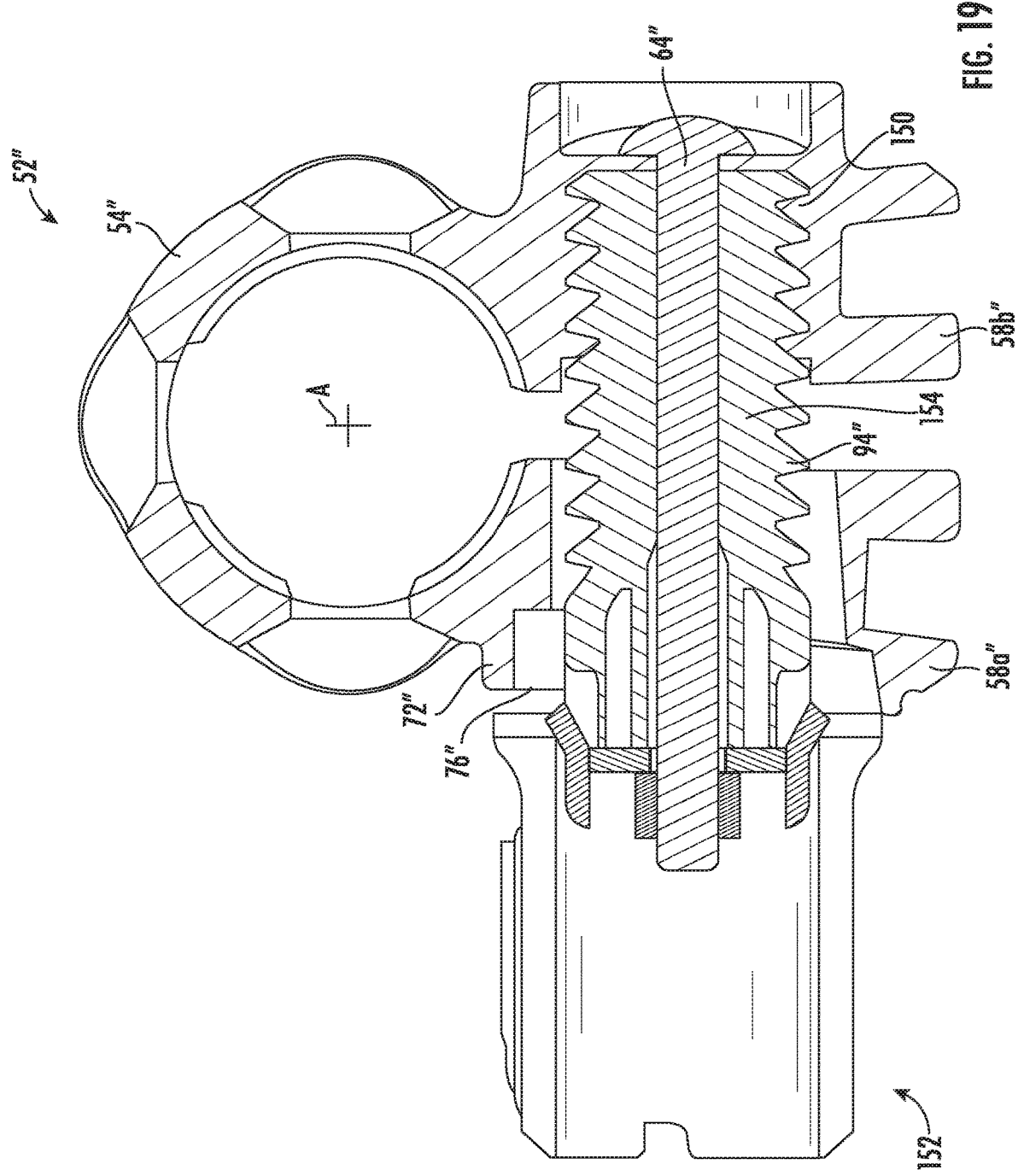
FIG. 19 is a front cross-section view of the coupler taken along line 19-19 in FIG. 17.
Figure 20:
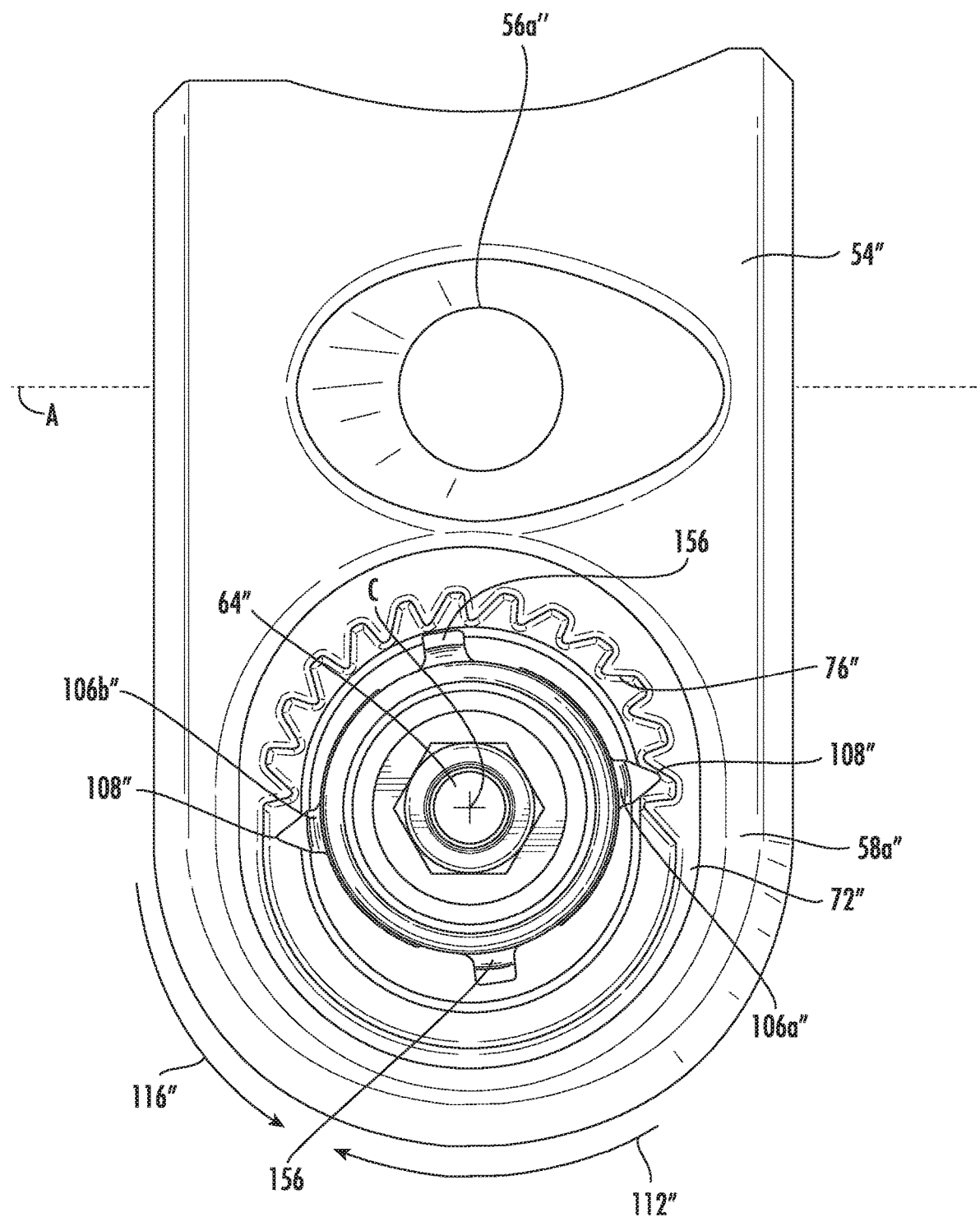
FIG. 20 is a side elevation view of the coupler of FIG. 17 with a knob removed from the coupler.

With reference to FIGS. 17 and 18, the coupler 52" includes a collar 54" defining a member receiving passage as described above. The member receiving passage extends along the central longitudinal axis A. The coupler 52" includes first and second lobes 58a", 58b" extending outwardly from the collar 54".

The first lobe 58a" includes a first cylindrical projection 72" extending therefrom. The first cylindrical projection 72" extends from the first lobe 58a" in a direction parallel to the axis C of the passage 62" that is defined in the first lobe. The passage 62" is non-threaded through the first lobe 58a". A plurality of first teeth 76" extend radially inwardly from the first cylindrical projection 72". Each of the first teeth 76" are bilaterally asymmetrical as described above.

The second lobe 58b" includes at least one second lobe ramp surface 150. The passage 62" is also defined in the second lobe 58*b*". The second lobe ramp surface 150 forms a female thread of the second lobe 58*b*" about the passage 62".

A rotatable knob 152 includes a first lever arm 90*a*" and a shank portion 154 connected to the first lever arm. The shank portion 154 includes a lever ramp surface 94" forming a male thread thereabout. The male thread of the shank portion 154 corresponds to the female thread of the second lobe 58*b*". The first lever arm 90*a*" of the rotatable knob 152 is rotatable about an axis C of the passage 62". Rotation of the rotatable knob 152 in the first direction 112" about the first axis C brings the first lobe 58*a*" and the second lobe 58*b*" toward each other.

A first pawl arm 106*a*" is resiliently trapped in the rotatable knob 152. The first pawl arm 106*a*" is movably connected to the first lever arm 90*a*". The first pawl arm 106*a*" includes a beveled tip 108" biased into engagement with the first teeth 76". The first pawl arm 106*a*" allows ratcheting rotation of the rotatable knob 152 about the first axis C in the first direction 112", but the beveled tip 108" of the first pawl arm catches in the first teeth 76" to prevent rotation of the rotatable knob about the first axis in the second direction 116". As discussed above, the coupler 52" may also include a second pawl arm 106*b*". In the present embodiment of the coupler 52", however, the first and second pawl arms 106*a*", 106*b*" are connected to each other as a single unitary piece. This piece, as discussed above, is resiliently trapped in the rotatable knob 152. Particularly, the piece includes two biasing members (shown as resilient clip members) 156 that ride in two respective clip channels 158 of the rotatable knob 152. Once fully inserted in the rotatable knob 152, the resilient clip members 156 snap outwardly to be trapped between the rotatable knob and the first lobe 58*a*". The resilient clip members 156 are not long enough to interfere with the first teeth 76".

To rotate the rotatable knob 152 freely in the second direction 116", the resilient clip members 156 are pressed radially inward such that they again occupy the clip channels 158 of the rotatable knob. In this radially inward position, the first and second pawl arms 106*a*", 106*b*" are then moved away from the first teeth 76" in a direction generally parallel to the first axis C. The rotatable knob 152 is then rotated in the second direction 116" to move the first and second lobes 58*a*", 58*b*" away from each other.

A fastener 64" extends through the passage 62" and longitudinally through the shank portion 154 of the rotatable knob 152. The fastener 64" couples the first lever arm 90*a*" of the rotatable knob 152 to the first and second lobes 58*a*", 58*b*" such that the lever ramp surface 94" is in caroming engagement with the second lobe ramp surface 150. This fastener 64" maintains the components in close enough relationship such that the threads 94", 150 engage each other and the first pawl arm 106*a*" engages the first teeth 76".

In operation, an operator mates the upper and lower booms 14, 18 by inserting the lower boom 14 into the upper boom 18 with the coupler 52" receiving the booms through the collar 54" along the central longitudinal axis A. The rotatable knob 152 and the shank portion 154 of the knob are in a position such that the first and second lobes 58*a*", 58*b*" are spaced apart from each other enough to allow the coupler 52" to loosely receive the booms 14, 18. After the collar 54" of the coupler 52" has received the booms 14, 18, the operator twists the rotatable knob 152 in a first direction, for instance, clockwise. This rotation of the rotatable knob 152 causes the shank portion 154, which includes the lever ramp surface 94" in the form of a male thread, to threadingly engage the second lobe ramp surface 150, thereby moving the first and second lobes toward each other 58*a*", 58*b*". In order to prevent inadvertent rotation of the knob 152 in the second direction, e.g.—counter-clockwise, the pawl arms 106*a*", 106*b*" engage the teeth 76" of the first lobe 58*a*" to allow ratcheting of the knob relative to the first lobe as the knob is rotated in the first direction. The ratcheting engagement between the pawl arms 106*a*", 106*b*" and the teeth 76" prevents the knob 152 from rotating relative to the first lobe 58*a*" in the second direction.

To release the coupler 52" and thereby loosen the collar 54" for detachment of the lower boom 14 from the upper boom 18, the operator presses the resilient clip members 156 radially inwardly to allow the pawl arms 106*a*", 106*b*" to disengage the teeth 76" by sliding axially along the axis C of the passage 62". Once the pawl arms 106*a*", 106*b*" are clear of the teeth 76", the rotatable knob 152 may be freely rotated by the user in the second direction to loosen the collar 54", thereby moving the lobes 58*a*", 58*b*" apart from each other.

Figure 16:
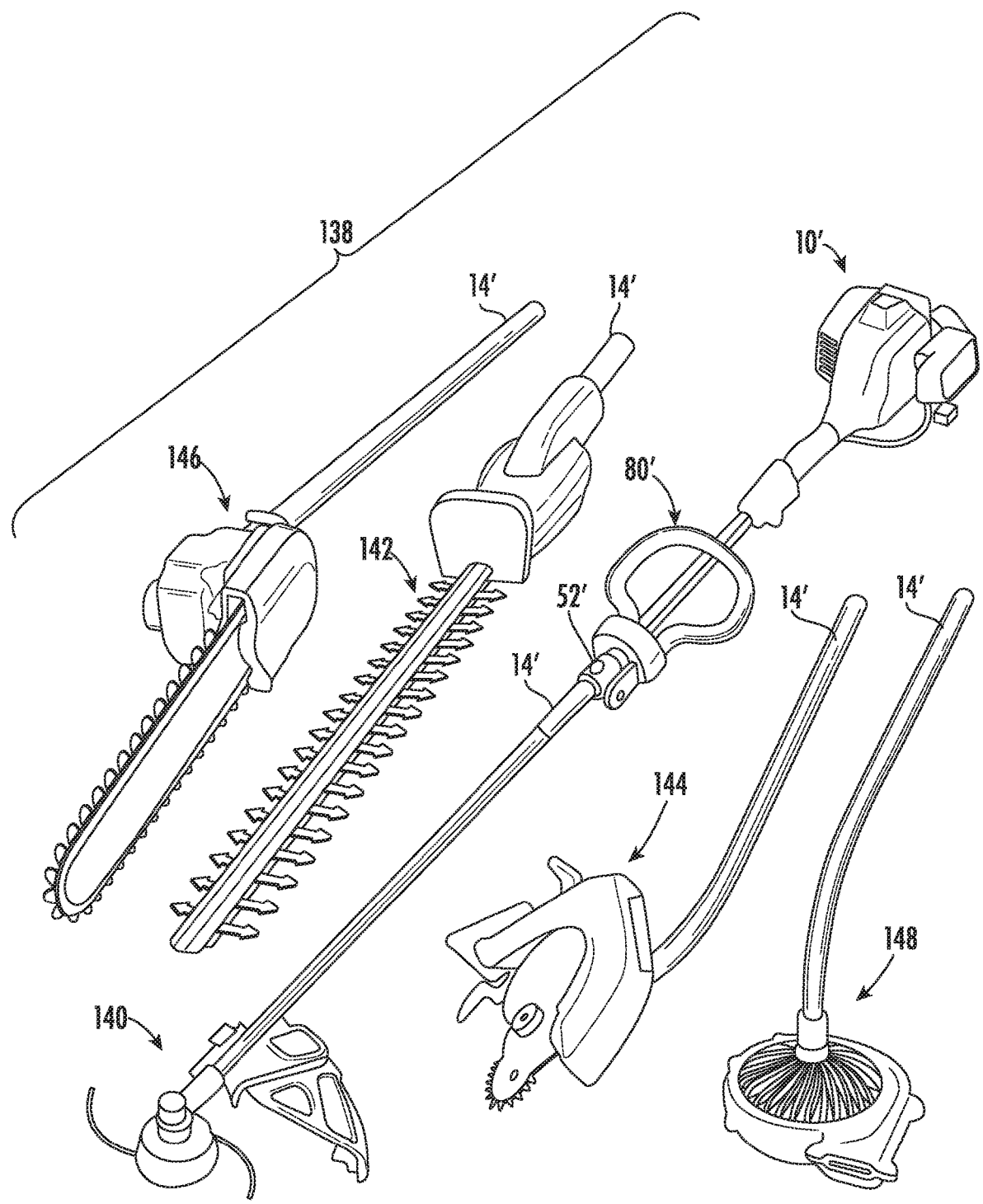
FIG. 16 is a perspective view of a landscape trimmer kit with attachments.

While the coupler 52, 52', 52" are described herein with respect to a lawn tool such as a trimmer, it should be understood that the coupler may be employed on any other lawn tool having an elongated boom or wand, such as pruners, loppers, shears, edgers, brush cutters, saws, mowers, hedge trimmers, blowers, vacuums, etc. Furthermore, in yet other embodiments, the coupler 52, 52', 52" may be employed on any other device having an elongated boom or wand, such as metal detectors, sweepers, polishers, brushes, cleaners, tillers/cultivators, etc. In some embodiments (e.g., as shown in FIG. 16), the above-mentioned implements may be interchangeable with the trimmer head portion 16 by releasing the lower boom 18 and inserting a different lower boom having the different implement. For example, FIG. 16 illustrates a landscape trimmer kit 138 having a string trimmer attachment 140 (e.g., the cutting head 20' with cutter 24'), a hedge trimmer attachment 142, an edger attachment 144, a pole saw (or pruner) attachment 146, and a blower attachment 148. Each attachment includes a lower boom 18 that couples with the upper boom 14 by way of any of the embodiments of the coupling and release mechanisms discussed herein.

The operator may change between the various attachments 140, 142, 144, 146, 148 described above couple a desired one of the attachments 140, 142, 144, 146, 148 by inserting the respective lower boom 14, 14' and moving the coupler 52" to the clamping position.

Thus, the invention may provide, among other things, a lawn tool or other device having upper and lower booms 14, 14', 18, 18' couplable by way of a clamping mechanism, such as the coupler 52, 52', 52".

Various features of the invention are set forth in the following claims.

What is claimed is:

1. A coupler for joining two members of a split-boom power tool, the coupler comprising:
   a collar defining a member receiving passage;
   a first lobe extending outwardly from the collar, the first lobe including
      at least one lobe ramp surface;
      a cylindrical projection extending from the first lobe and radially surrounding the lobe ramp surface; and
      a gear extending from the cylindrical portion, the gear including gear teeth;
   a second lobe extending outwardly from the collar;
   a passage defined in the first lobe and the second lobe, the passage defining a first axis;

a lever arm rotatable about the first axis, the lever arm including at least one lever ramp surface;
a pawl arm movably connected to the lever arm, the pawl arm including a portion biased into engagement with the gear teeth;
a fastener extending through the passage, the fastener coupling the lever arm to the first lobe such that the lever ramp surface is in camming engagement with the lobe ramp surface; and
wherein rotation of the lever arm about the first axis in a first direction brings the first lobe and the second lobe toward each other.

2. The coupler of claim 1, wherein the cylindrical projection also radially surrounds at least a portion of the lobe ramp surface.

3. The coupler of claim 1, wherein
the pawl arm ratchets relative to the gear in the first direction;
the pawl arm catches in the gear teeth when the pawl arm is engaged with the gear teeth and the lever arm experiences a rotational force in a second direction about the first axis, thereby preventing rotation of the lever arm in the second direction; and
the second direction is opposite the first direction.

4. The coupler of claim 3, further comprising
an actuator operably coupled to the pawl arm; and
wherein actuation of the actuator moves the pawl arm out of engagement with the gear teeth.

5. The coupler of claim 4, wherein the actuator is formed of a single unitary piece with the pawl arm.

6. The coupler of claim 5, further comprising
a yoke arm operatively coupled to the actuator;
a post extending from the pawl arm; and
wherein
the actuator and the yoke arm are rotatably mounted about a pivot axis;
rotation of the actuator causes rotation of the yoke arm about the pivot axis;
the yoke arm engages the post; and
rotation of the yoke arm about the pivot axis causes linear movement of the pawl arm.

7. The coupler of claim 1, wherein
the collar includes a circumferential break; and
a gap is defined between the first lobe and the second lobe.

8. The coupler of claim 1, further comprising
a handle lever including a handle portion and a lever portion; and
wherein the lever portion includes the lever arm.

9. The coupler of claim 1, further comprising
a split-boom power tool including a first boom member and a second boom member, the second boom member removably connected coaxially to the first boom member at an interface; and
wherein the collar of the coupler is disposed coaxially to the first boom member and the second boom member about the interface.

10. The coupler of claim 1, wherein the lever arm is a first lever arm, and further comprising
a second lever arm rotatable about the first axis, the second lever arm including at least one lever ramp surface including an axially tallest portion; and
wherein
the second lobe includes at least one lobe ramp surface, the lobe ramp surface of the second lobe including an axial tallest portion;
the fastener couples the second lever arm to the second lobe such that the lever ramp surface of the second lever arm is in camming engagement with the lobe ramp surface of the second lobe; and
rotation of the second lever arm about the first axis in the first direction brings the axially tallest portion of the lobe ramp surface of the second lobe and the axially tallest portion of the lever ramp surface of the second lever arm toward each other.

11. A coupler for joining two members of a split-boom power tool, the coupler comprising:
a collar defining a member receiving passage;
a first lobe extending outwardly from the collar,
a second lobe extending outwardly from the collar;
one of the first lobe and the second lobe including a plurality of teeth extending radially therefrom;
one of the first lobe and the second lobe including at least one lobe ramp surface;
a passage defined in the first lobe and the second lobe, the passage defining a first axis;
a lever arm rotatable about the first axis, the lever arm including at least one lever ramp surface;
a pawl arm movably connected to the lever arm, the pawl arm including a portion biased into engagement with the teeth;
a fastener extending through the passage, the fastener coupling the lever arm to the first lobe and the second lobe such that the lever ramp surface is in camming engagement with the lobe ramp surface; and
wherein rotation of the lever arm about the first axis in a first direction brings the first lobe and the second lobe toward each other.

12. The coupler of claim 11, wherein
the pawl arm ratchets relative to the teeth in the first direction;
the pawl arm catches in the teeth when the pawl arm is engaged with the teeth and the lever arm experiences a rotational force in a second direction about the first axis, thereby preventing rotation of the lever arm in the second direction; and
the second direction is opposite the first direction.

13. The coupler of claim 12, further comprising
a knob including
the lever arm and a shank portion connected to the lever arm, the lever ramp surface connected to the shank portion; and
wherein
the pawl arm is resiliently trapped in the knob;
the lobe ramp surface forms a female thread; and
the at least one lever ramp forms a corresponding male thread.

14. The coupler of claim 13, wherein the fastener further extends longitudinally through the shank portion of the knob.

15. The coupler of claim 11, wherein the passage through the first lobe is non-threaded.

16. The coupler of claim 11, wherein
the first lobe includes the plurality of teeth; and
the second lobe includes the at least one lobe ramp surface.

17. A coupler for joining two members of a split-boom power tool, the coupler comprising:
a collar defining a member receiving passage;
a lever arm rotatable relative to the collar in a first direction to constrict the member receiving passage, the lever arm rotatable relative to the collar in a second direction to expand the member receiving passage;
a ratcheting assembly engaging the collar with the lever arm, the ratcheting assembly allowing rotation of the lever arm relative to the collar in the first direction and the ratcheting assembly preventing rotation of the lever arm relative to the collar in the second direction;

a biasing member maintaining the collar and the lever arm in engagement; and wherein actuation against the biasing member removes the collar and the lever arm from engagement, allowing the lever arm to be freely rotated relative to the collar in the second direction.

18. The coupler of claim 17, wherein the ratcheting assembly includes a pawl arm and a plurality of teeth; and the biasing member maintains the pawl arm in engagement with the plurality of teeth.

19. The coupler of claim 18, further comprising an actuator connected to the pawl arm; and wherein actuation of the actuator against a bias of the biasing member moves the pawl arm out of engagement with the plurality of teeth.

20. The coupler of claim 18, wherein the biasing member includes a resilient clip member;

the resilient clip member is connected to the pawl arm; and actuation against a bias of the resilient clip member allows removal of the pawl arm from engagement with the plurality of teeth.

* * * * *